(12) United States Patent
Glynn

(10) Patent No.: US 9,048,927 B2
(45) Date of Patent: Jun. 2, 2015

(54) SOLAR POWERED MOBILE PHONE

(75) Inventor: Alex P. Glynn, Orlando, FL (US)

(73) Assignee: GlynnTech, Inc., Flemington, NJ (US)

( * ) Notice: Subject to any disclaimer, the term of this patent is extended or adjusted under 35 U.S.C. 154(b) by 78 days.

(21) Appl. No.: 13/200,959

(22) Filed: Oct. 4, 2011

(65) Prior Publication Data

US 2013/0084919 A1    Apr. 4, 2013

(51) Int. Cl.
| H04B 1/38 | (2006.01) |
| H04M 1/00 | (2006.01) |
| H04B 7/15 | (2006.01) |
| H04B 7/185 | (2006.01) |
| H04B 7/00 | (2006.01) |
| H04B 1/02 | (2006.01) |
| H04B 1/16 | (2006.01) |
| H04B 1/06 | (2006.01) |

(52) U.S. Cl.
CPC .................................. *H04B 1/3833* (2013.01)

(58) Field of Classification Search
USPC ......... 455/11.1, 12.1, 343.6, 344, 343.1, 345, 455/427, 404.1, 422.1, 423, 550.1, 566, 455/572, 573, 575, 575.6, 575.1, 575.3; 345/156; 348/148; 136/245; 244/172.7; 705/418; 370/310; 715/839; 340/636.1, 340/870.02; 342/357.74; 361/679.02
See application file for complete search history.

(56) References Cited

U.S. PATENT DOCUMENTS

| 4,122,396 A | * | 10/1978 | Grazier et al. ............. 455/343.1 |
| 5,008,952 A | * | 4/1991 | Davis et al. ................... 455/427 |
| 5,020,150 A | * | 5/1991 | Shannon .................... 455/343.1 |
| 5,129,095 A | * | 7/1992 | Davis et al. .................. 455/12.1 |
| 5,161,255 A | * | 11/1992 | Tsuchiya ....................... 455/345 |
| RE34,496 E | * | 1/1994 | Franklin et al. ............. 455/404.1 |
| 5,287,541 A | * | 2/1994 | Davis et al. .................... 455/427 |
| 5,377,256 A | * | 12/1994 | Franklin et al. ............. 455/404.1 |
| 5,410,728 A | * | 4/1995 | Bertiger et al. ............... 455/428 |
| 5,551,065 A | * | 8/1996 | Honore ......................... 455/66.1 |
| 5,604,920 A | * | 2/1997 | Bertiger et al. ............... 455/428 |
| 5,641,134 A | * | 6/1997 | Vatt .............................. 455/12.1 |
| 5,761,485 A | * | 6/1998 | Munyan ........................ 715/839 |
| 5,794,138 A | * | 8/1998 | Briskman ..................... 455/344 |
| 5,898,932 A | * | 4/1999 | Zurlo et al. .................... 455/573 |
| 5,943,627 A | * | 8/1999 | Kim et al. .................... 455/569.1 |
| 6,006,103 A | * | 12/1999 | Van Lerberghe .......... 455/575.3 |
| 6,014,089 A | * | 1/2000 | Tracy et al. .............. 340/870.02 |
| 6,023,616 A | * | 2/2000 | Briskman ..................... 455/344 |
| 6,047,161 A | * | 4/2000 | Sowles et al. ................ 455/12.1 |
| 6,133,871 A | * | 10/2000 | Krasner .................... 342/357.74 |
| 6,150,955 A | * | 11/2000 | Tracy et al. .............. 340/870.02 |
| 6,205,320 B1 | * | 3/2001 | Coleman ...................... 455/13.1 |
| 6,434,372 B1 | * | 8/2002 | Neagley et al. .............. 455/106 |
| 7,031,757 B2 | * | 4/2006 | Schwengler et al. ......... 455/572 |
| 7,053,798 B2 | * | 5/2006 | Popineau ........................ 341/20 |
| 7,072,696 B2 | * | 7/2006 | Shaff ............................ 455/572 |
| 7,085,568 B2 | * | 8/2006 | Sivakumar ................. 455/435.1 |
| 7,148,807 B2 | * | 12/2006 | Moro et al. ................ 340/636.1 |
| 7,231,224 B1 | * | 6/2007 | Chesson ........................ 455/523 |

(Continued)

*Primary Examiner* — William D Cumming

(74) *Attorney, Agent, or Firm* — Kenneth P. Glynn; Deirdra M. Meagher

(57) ABSTRACT

A solar powered cell phone includes a cell phone main housing including conventional cell phone components including; a rechargeable power storage unit connected to cell phone internal mechanisms; and, at least two solar cell panels connected to the rechargeable power storage unit, wherein at least one of the at least two solar cell panels is movably connected to the main housing and has a first position, being a closed position for storage, and having a second position, being an open position for charging.

9 Claims, 36 Drawing Sheets

(56) References Cited

U.S. PATENT DOCUMENTS

| | | | |
|---|---|---|---|
| 7,251,509 B1* | 7/2007 | Wang | 455/574 |
| 7,295,865 B2* | 11/2007 | Wang | 455/573 |
| 7,343,180 B2* | 3/2008 | Kazakevich et al. | 455/574 |
| 7,366,120 B2* | 4/2008 | Handforth et al. | 370/310 |
| 7,551,894 B2* | 6/2009 | Gerber et al. | 455/41.2 |
| 7,795,528 B2* | 9/2010 | Lee | 136/245 |
| 7,853,288 B2* | 12/2010 | Ma | 455/550.1 |
| 7,900,875 B2* | 3/2011 | Criswell | 244/172.7 |
| 7,920,891 B2* | 4/2011 | Kwak | 455/550.1 |
| 8,074,936 B2* | 12/2011 | Criswell | 244/172.7 |
| 8,305,741 B2* | 11/2012 | Chatterjee | 361/679.02 |
| 8,385,986 B2* | 2/2013 | Kim | 455/574 |
| 8,467,835 B2* | 6/2013 | Lee et al. | 455/566 |
| 8,515,505 B1* | 8/2013 | Pattikonda | 455/575.6 |
| 8,521,082 B1* | 8/2013 | Lopez | 455/11.1 |
| 2002/0049056 A1* | 4/2002 | Sivakumar | 455/435 |
| 2002/0128052 A1* | 9/2002 | Neagley et al. | 455/575 |
| 2004/0106441 A1* | 6/2004 | Kazakevich et al. | 455/574 |
| 2004/0198337 A1* | 10/2004 | Schwengler et al. | 455/422.1 |
| 2005/0075149 A1* | 4/2005 | Gerber et al. | 455/575.1 |
| 2005/0282591 A1* | 12/2005 | Shaff | 455/572 |
| 2006/0009251 A1* | 1/2006 | Noda et al. | 455/550.1 |
| 2006/0030289 A1* | 2/2006 | Liguori et al. | 455/344 |
| 2007/0202833 A1* | 8/2007 | Wang | 455/343.1 |
| 2007/0298753 A1* | 12/2007 | Tary et al. | 455/343.6 |
| 2009/0011793 A1* | 1/2009 | Pocrass | 455/556.1 |
| 2009/0054052 A1* | 2/2009 | Evans | 455/420 |
| 2009/0061945 A1* | 3/2009 | Ma | 455/566 |
| 2009/0082065 A1* | 3/2009 | Kwak | 455/564 |
| 2009/0111501 A1* | 4/2009 | Tang et al. | 455/522 |
| 2009/0192950 A1* | 7/2009 | King et al. | 705/418 |
| 2010/0167797 A1* | 7/2010 | Morichi | 455/572 |
| 2010/0177036 A1* | 7/2010 | Nam | 345/156 |
| 2010/0210322 A1* | 8/2010 | Kim et al. | 455/574 |
| 2010/0279740 A1* | 11/2010 | Lee et al. | 455/566 |
| 2010/0317413 A1* | 12/2010 | Tan | 455/573 |
| 2011/0013020 A1* | 1/2011 | Jo | 348/148 |
| 2011/0039606 A1* | 2/2011 | Kim | 455/574 |
| 2011/0065474 A1* | 3/2011 | Won et al. | 455/556.1 |
| 2011/0111811 A1* | 5/2011 | Juang et al. | 455/573 |
| 2011/0159869 A1* | 6/2011 | Kurose et al. | 455/423 |
| 2011/0312391 A1* | 12/2011 | Benise | 455/572 |
| 2012/0088524 A1* | 4/2012 | Moldavsky et al. | 455/456.3 |
| 2012/0214546 A1* | 8/2012 | Osaka | 455/556.1 |
| 2012/0302219 A1* | 11/2012 | Vang | 455/414.1 |
| 2012/0302228 A1* | 11/2012 | Gray | 455/422.1 |
| 2013/0040707 A1* | 2/2013 | Metcalf | 455/566 |
| 2013/0084919 A1* | 4/2013 | Glynn | 455/566 |

* cited by examiner

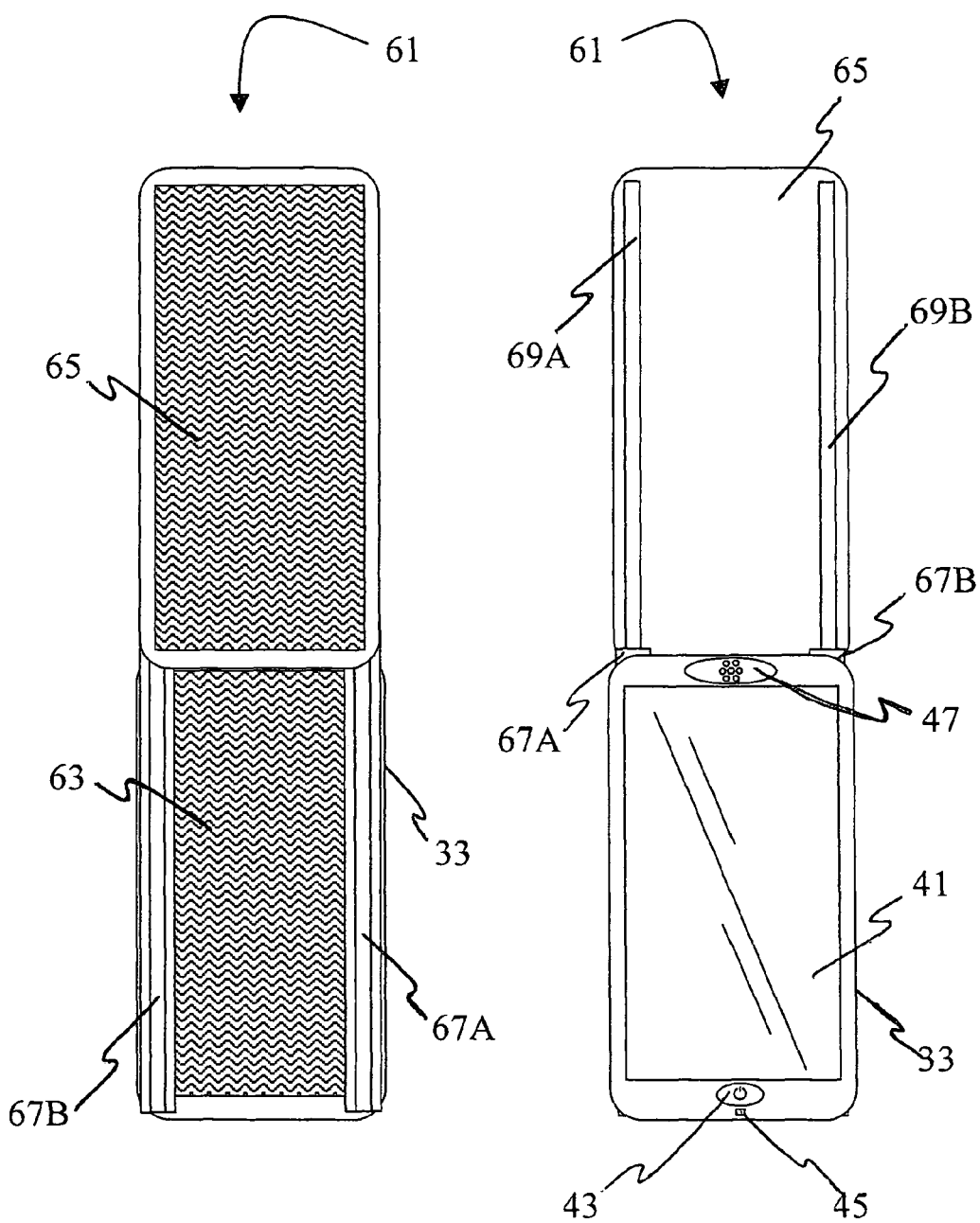

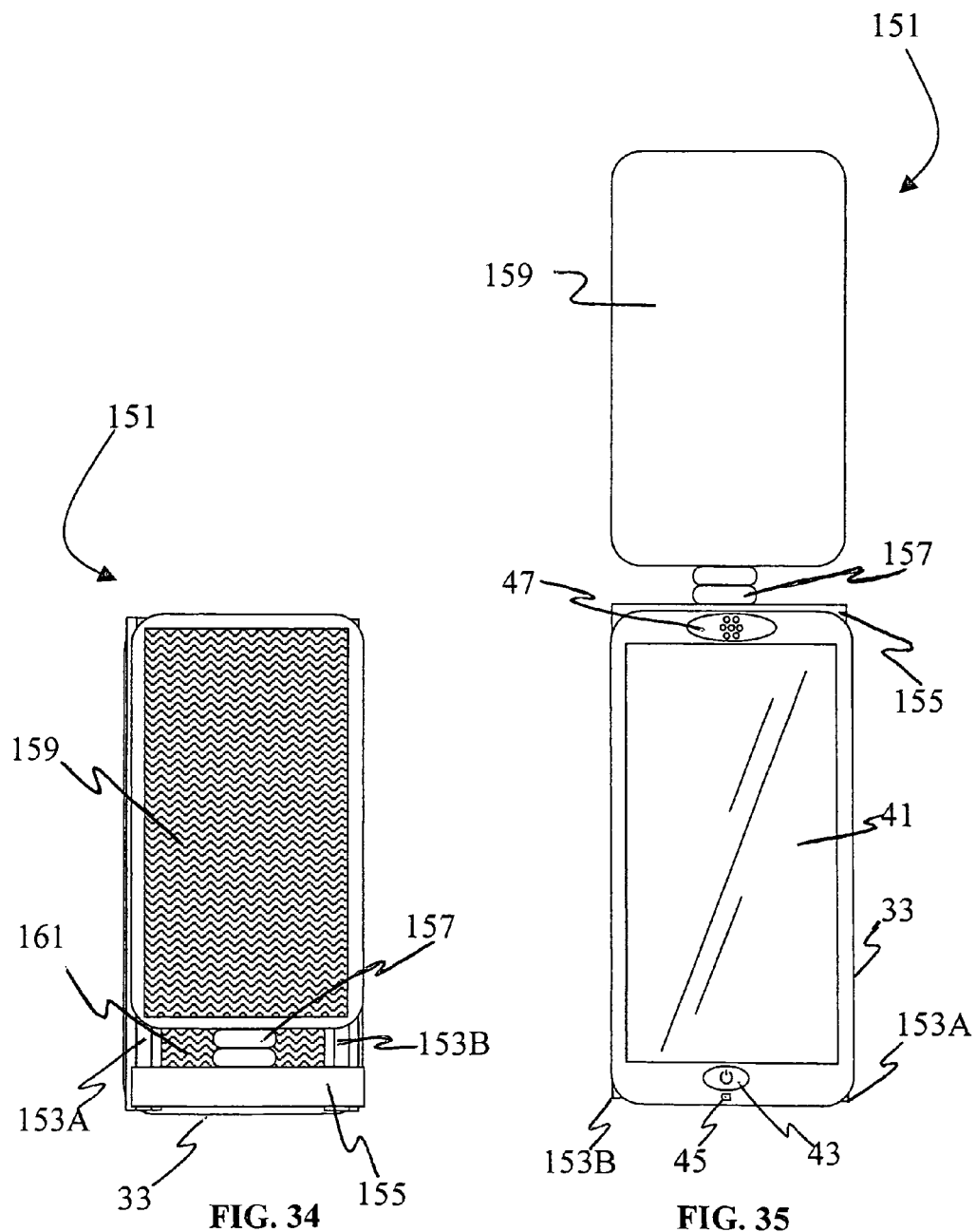

US 9,048,927 B2

SOLAR POWERED MOBILE PHONE

BACKGROUND OF INVENTION a. Field of Invention

The invention relates generally to alternative energy sources. More specifically, the invention relates to recharging rechargeable electronic devices such as mobile telephones using solar energy.

b. Description of Related Art

The following patents are representative of the field pertaining to the present invention:

U.S. Pat. No. 7,072,696 B2 to Shaff describes a mobile telephone apparatus in which a solar power source is used to supplement battery power. A solar cell array is positioned on the surface of the telephone and supplies electric current to that telephone. A preferred embodiment of the present invention is equipped with speech recognition software that allows the user to issue commands (such as dialing the telephone) verbally to the telephone. In addition, this speech recognition may be used to operate an integrated AM/FM broadcast radio to allow the telephone to double as a radio. In an alternative embodiment, the solar mobile telephone is integrated into a headset to allow for convenient hands-free operation.

U.S. Pat. No. 5,898,932 to Zurlo et al. describes a new and improved portable cellular phone with integral solar panel including a portable cellular telephone with a rectangular configuration having a front face, a rear face, and a periphery formed therebetween defining an interior space. The front face has a plurality of operating components including a display, a plurality of keys, a microphone, and a speaker situated thereon for allowing conventional usage of the telephone. A planar rectangular solar panel is coupled to the rear face of the telephone. The solar panel is adapted to convert ambient light into electric power. At least one rechargeable battery is situated within the interior space of the telephone and electrically connected to the operating components of the phone for supplying power thereto. Finally, power connection circuitry is electrically connected between the solar panel and the batteries. The power connection circuitry is adapted to permit the flow of power from the solar panel to the at least one battery and further preclude the flow of power from the at least one battery to the solar panel.

Notwithstanding the prior art, the present invention is neither taught nor rendered obvious thereby.

SUMMARY OF INVENTION

A present invention solar powered cell phone includes: a) a cell phone main housing; b) cell phone internal mechanisms located within the cell phone main housing, the cell phone internal mechanisms including at least one processor, at least one storage means, at least one speaker, and at least one microphone; c) a screen connected to the cell phone internal mechanisms and located on the cell phone main housing; d) at least one antenna connected to the cell phone internal mechanisms and attached to the cell phone main housing, the at least one antenna adapted to send and receive information; e) a rechargeable power storage unit connected to the cell phone internal mechanisms; and, f) at least two solar cell panels connected to the rechargeable power storage unit, wherein at least one of the at least two solar cell panels is movably connected to the main housing, at least one of the at least two solar cell panels having a first position, being a closed position, and having a second position, being an open position; wherein at least one of the at least two solar cell panels is movable from the first position to the second position for solar recharging of the rechargeable power storage unit, and is movable from the second position to the first position for storage.

In some preferred embodiments of the solar powered cell phone described in paragraph [0006], at least one of the at least two solar cell panels is hingedly connected to the main housing for flip up movement from the first position to the second position and subsequently from the second position to the first position.

In some preferred embodiments of the solar powered cell phone described in paragraph [0006], at least one of the at least two solar cell panels is slidably connected to the main housing for sliding movement from the first position to the second position and subsequently from the second position to the first position.

In some preferred embodiments of the solar powered cell phone described in paragraph [0006], at least one of the at least two solar cell panels is pivotally connected to the main housing so as to allow single plane rotation of the at least two solar cell panels for pivoting rotational movement from the first position to the second position and subsequently from the second position to the first position.

In some preferred embodiments of the solar powered cell phone described in paragraph [0006], at least one of the at least two solar cell panels is telescopically connected to the main housing for telescopic movement from the first position to the second position and subsequently from the second position to the first position.

In some preferred embodiments of the solar powered cell phone described in paragraph [0006], at least one of the at least two solar cell panels is connected to the main housing by a compound movement connection that includes a hinge and a rotational connector connected to the hinge, wherein one of the hinge and the rotational connector is connected to at least one of the at least two solar cell panels and the other of the hinge and rotational connector is connected to the main housing such that the at least one of the at least two solar cell panels is movable via flip up movement along the hinge, and by rotational movement in a different direction along the rotational connector, from the first position to the second position and subsequently from the second position to the first position.

In some preferred embodiments of the solar powered cell phone described in paragraph [0006], at least one of the at least two solar cell panels is connected to the main housing by a compound movement connection that includes a sliding mechanism and a rotational connector connected to the sliding mechanism, wherein one of the sliding mechanism and the rotational connector is connected to at least one of the at least two solar cell panels and the other of the sliding mechanism and rotational connector is connected to the main housing such that at least one of the at least two solar cell panels is movable via sliding movement, and by rotational movement in a different direction along the rotational connector, from the first position to the second position and subsequently from the second position to the first position.

In some preferred embodiments of the solar powered cell phone described in paragraph [00012], the sliding mechanism is at least one track and rail.

In some preferred embodiments of the solar powered cell phone described in paragraph [0006], at least one of the at least two solar cell panels is connected to the main housing by a compound movement connection that includes a pivot point and a rotational connector connected to the pivot point, wherein one of the pivot point and the rotational connector is connected to at least one of the at least two solar cell panels and the other of the pivot point and rotational connector is connected to the main housing such that at least one of the at least two solar cell panels is movable via pivoting rotational movement, and by rotational movement in a different direction along the rotational connector, from the first position to the second position and subsequently from the second position to the first position.

In some preferred embodiments of the solar powered cell phone described in paragraph [0006], at least one of the at least two solar cell panels is connected to the main housing by a compound movement connection that includes a pivot point and a hinge connected to the pivot point, wherein one of the pivot point and the hinge is connected to at least one of the at least two solar cell panels and the other of the pivot point and hinge is connected to the main housing such that at least one of the at least two solar cell panels is movable via pivoting rotational movement, and by flip up movement in a different direction along the hinge, from the first position to the second position and subsequently from the second position to the first position.

Another embodiment of the present invention solar powered cell phone includes a cell phone main housing; cell phone internal mechanisms located within the cell phone main housing, the cell phone internal mechanisms including at least one processor, at least one storage means, at least one speaker, and at least one microphone; a screen connected to the cell phone internal mechanisms and located on the cell phone main housing; at least one antenna connected to the cell phone internal mechanisms and attached to the cell phone main housing, the at least one antenna adapted to send and receive information; a rechargeable power storage unit connected to the cell phone internal mechanisms; at least one fixed solar cell immovably connected to the cell phone main housing and electrically connected to the rechargeable power storage unit; and at least one movable solar cell movably connected to the cell phone main housing and electrically connected to the rechargeable power storage unit, wherein said at least one movable solar cell panel has a first position, being a closed position, and a second position, being an open position, wherein at least one of the at least two solar cell panels is movable from the first position to the second position for solar recharging of the rechargeable power storage unit, and is movable from the second position to the first position for storage.

In some preferred embodiments of the present invention solar powered cell phone described in paragraph [00016], at least one of the at least two solar cell panels is hingedly connected to the main housing for flip up movement from the first position to the second position and subsequently from the second position to the first position.\

In some preferred embodiments of the present invention solar powered cell phone described in paragraph [00016], at least one of the at least two solar cell panels is slidably connected to the main housing for sliding movement from the first position to the second position and subsequently from the second position to the first position.

In some preferred embodiments of the present invention solar powered cell phone described in paragraph [00016], at least one of the at least two solar cell panels is pivotally connected to the main housing so as to allow single plane rotation of the at least two solar cell panels for pivoting pivoting rotational movement from said first position to said second position and subsequently from said second position to said first position.

In some preferred embodiments of the present invention solar powered cell phone described in paragraph [00016], at least one of the at least two solar cell panels is telescopically connected to the main housing for telescopic movement from the first position to the second position and subsequently from the second position to the first position.

In some preferred embodiments of the present invention solar powered cell phone described in paragraph [00016], at least one of the at least two solar cell panels is connected to the main housing by a compound movement connection the includes a hinge and a rotational connector connected to the hinge, wherein one of the hinge and the rotational connector is connected to at least one of the at least two solar cell panels and the other of the hinge and rotational connector is connected to the main housing such that at least one of the at least two solar cell panels is movable via flip up movement along the hinge, and by rotational movement in a different direction along the rotational connector, from the first position to the second position and subsequently from the second position to the first position.

In some preferred embodiments of the present invention solar powered cell phone described in paragraph [00016], at least one of the at least two solar cell panels is connected to the main housing by a compound movement connection that includes a sliding mechanism and a rotational connector connected to the sliding mechanism, wherein one of the sliding mechanism and the rotational connector is connected to at least one of the at least two cell panels and the other of the sliding mechanism and rotational connector is connected to the main housing such that at least one of the at least two solar cell panels is movable via sliding movement, and by rotational movement in a different direction along the rotational connector, from the first position to the second position and subsequently from the second position to the first position.

In some preferred embodiments of the present invention solar powered cell phone described in paragraph [00022], the sliding movement mechanism is at least one track and rail.

In some preferred embodiments of the present invention solar powered cell phone described in paragraph [00016], at least one of the at least two solar cell panels is connected to the main housing by a compound movement connection that includes a pivot point and a rotational connector connected to the pivot point, wherein one of the pivot point and the rotational connector is connected to at least one of the at least two solar cell panels and the other of the pivot point and rotational connector is connected to the main housing such that at least one of the at least two solar cell panels is movable via pivoting rotational movement, and by rotational movement in a different direction along the rotational connector, from the first position to the second position and subsequently from the second position to the first position.

In some preferred embodiments of the present invention solar powered cell phone described in paragraph [00016], at least one of the at least two solar cell panels is connected to the main housing by a compound movement connection that includes a pivot point and a hinge connected to the pivot point, wherein one of the pivot point and the hinge is connected to at least one of the at least two solar cell panels and other of said pivot point and hinge is connected to the main housing such that at least one of the at least two solar cell panels is movable via pivoting rotational movement, and by flip up movement in a different direction along the hinge, from the first position to the second position and subsequently from the second position to the first position.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 8 is a rear elevation view of another embodiment of a present invention solar powered cell phone, in open position;

FIG. 9 is a front elevation view of the embodiment of the present invention solar powered cell phone shown in FIG. 8, in open position;

FIG. 34 is a rear elevation view of another embodiment of a present invention solar powered cell phone, shown in closed position;

FIG. 35 is a front elevation view of the embodiment of a present invention solar powered cell phone shown in FIG. 34, in open position;

Figure 43:
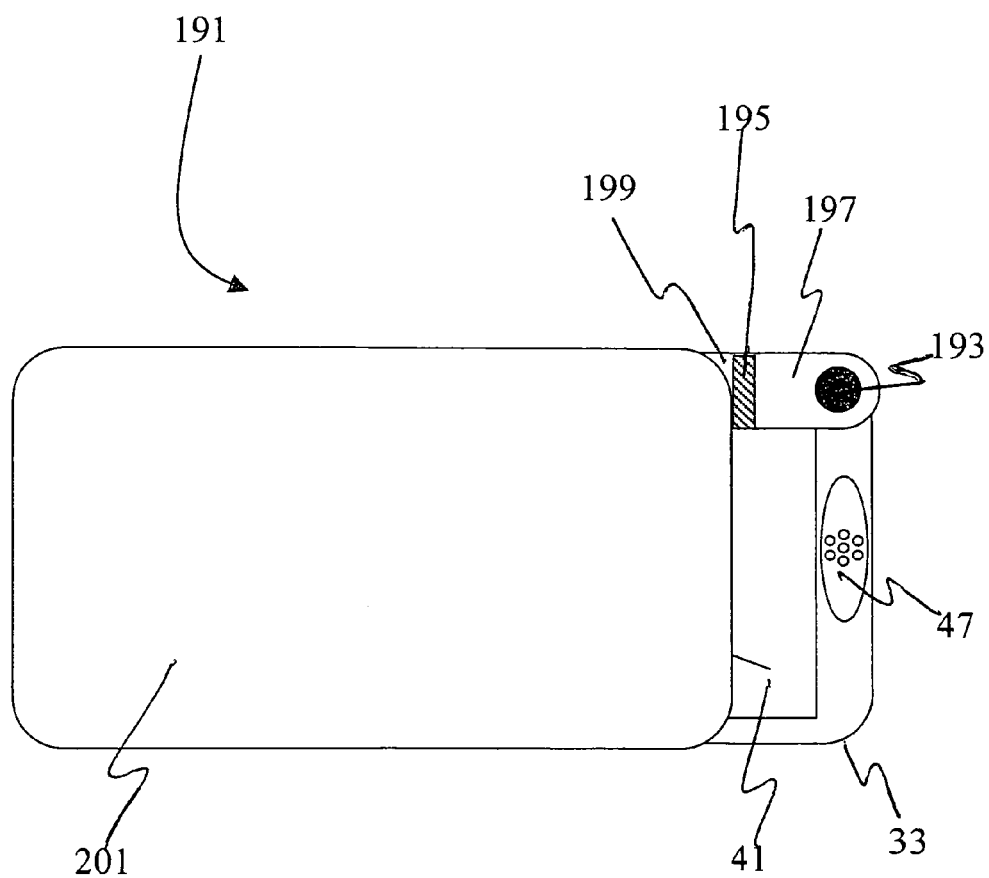
FIG. 43 is a front elevation view of another embodiment of a present invention solar powered cell phone, in closed position.
Figure 45:
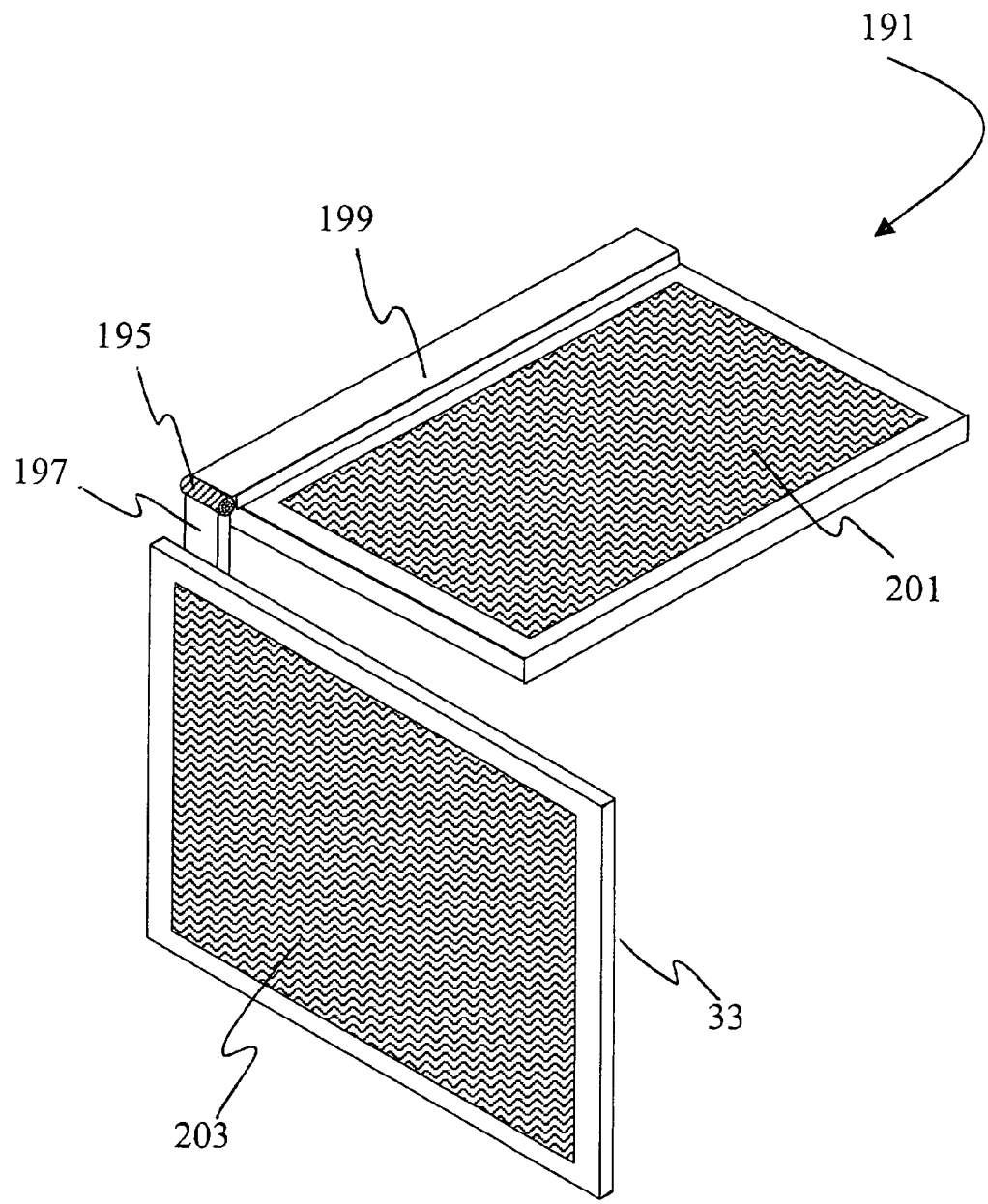
Figure 46:
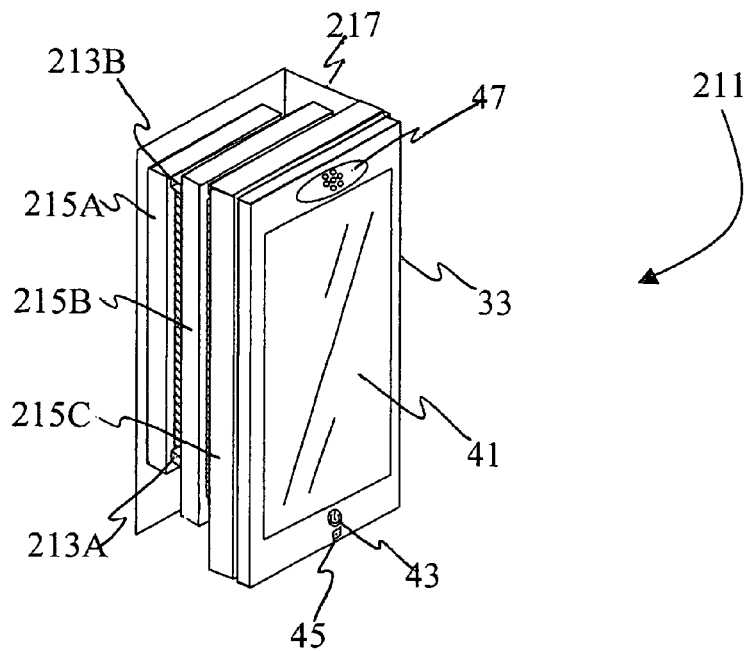
Figure 47:
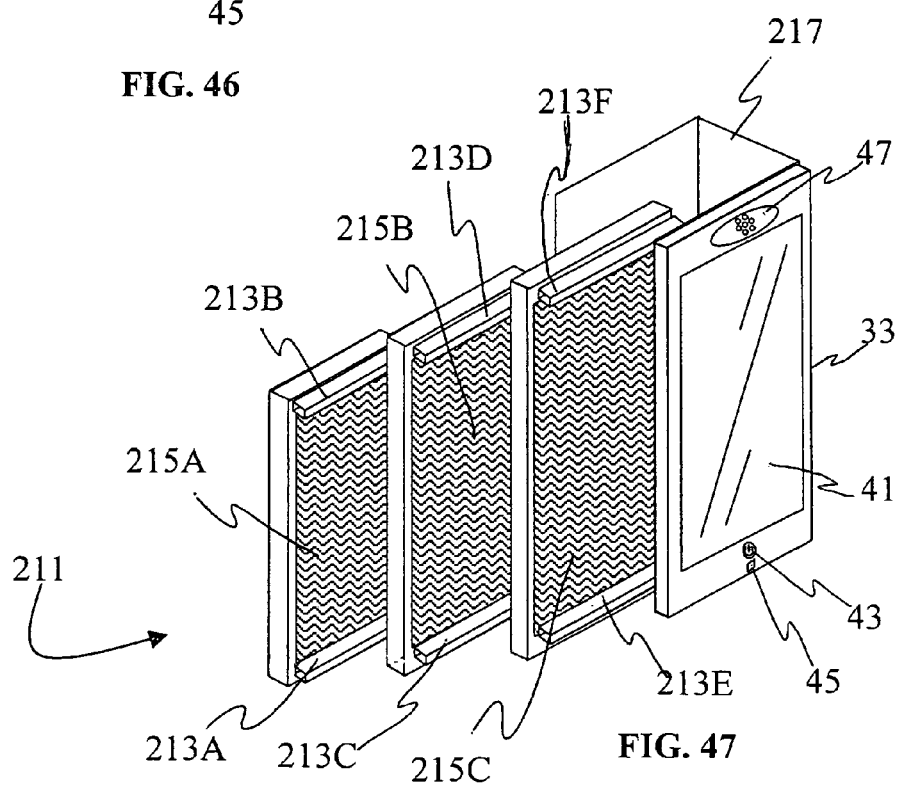
Figure 48:
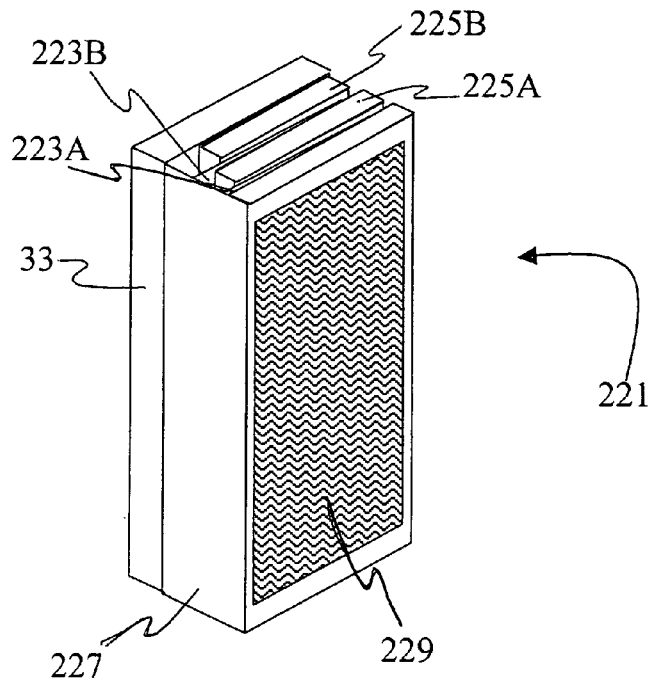
Figure 49:
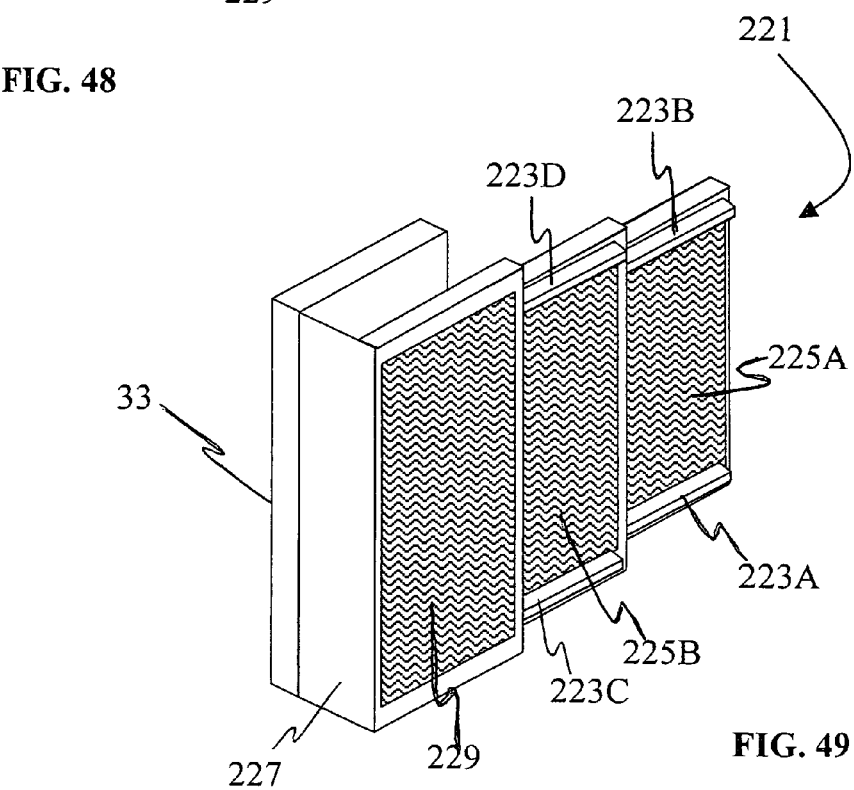

is a front elevation view of the embodiment of a present invention solar powered cell phone shown in FIG. 43, in open position;

FIG. 45 is a perspective view of the embodiment of a present invention solar powered cell phone shown in FIG. 43, in open position;

FIG. 46 is a perspective view of another embodiment of a present invention solar powered cell phone, in closed position;

FIG. 47 is a perspective view of the embodiment of a present invention solar powered cell phone shown in FIG. 46, in open position;

FIG. 48 is a perspective view of another embodiment of a present invention solar powered cell phone, in closed position; and FIG. 49 is a perspective view of the embodiment of a present invention solar powered cell phone shown in FIG. 48, in open position.

DETAILED DESCRIPTION OF THE EMBODIMENTS

Referring now in detail to the drawings wherein like reference numerals designate corresponding parts throughout the several views, various embodiments of the present invention are shown.

Figure 1:
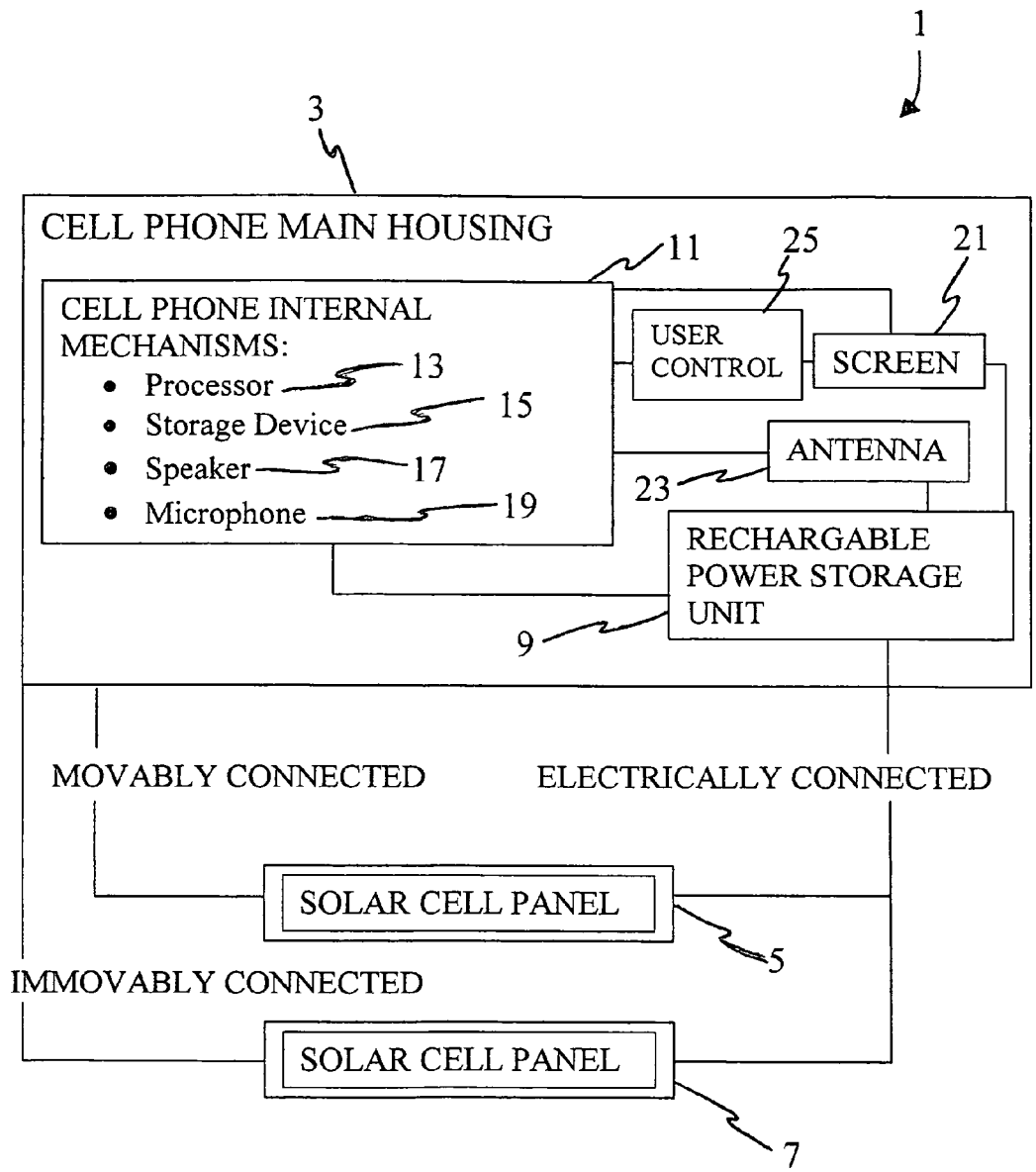
FIG. 1 is a schematic diagram of an embodiment of a present invention solar powered cell phone.

FIG. 1 is a schematic diagram of an embodiment of a present invention solar powered cell phone. A solar powered cell phone 1 includes a cell phone main housing 3. A solar cell panel 5 is movably connected to the cell phone main housing 3. As shown in FIG. 1, another solar cell panel 7 is immovably connected to the cell phone main housing 3. In some alternate embodiments of the present invention solar powered cell phone, solar cell panel 7 is not immovably connected, but instead is movably connected to the cell phone main housing. Thus, in some embodiments of the present invention solar powered cell phone, at least one panel is movably attached and at least one other is immovably attached; in other embodiments there are no immovable panels, but there are two or more movable panels.

A rechargeable power storage unit 9 is located within the cell phone main housing 3. This rechargeable power storage unit is electrically connected to the at least one solar cell panel 5, the at least one solar panel 7, the cell phone internal mechanisms 11, the screen 21, and the antenna 23. The rechargeable power storage unit 9 may be any type of power storage capable of being recharged. In some embodiments, the rechargeable power storage unit 9 is a battery, while in other embodiments the rechargeable power storage unit 9 is a capacitor. The features described in this paragraph should be familiar to one having skill in the art of cellular phones.

The cell phone main housing 3 contains cell phone internal mechanisms 11, which include a processor 13, a storage device 15 (such as a hard drive, flash memory, communication with an internet storage server, and solid-state media), a speaker 17, and a microphone 19. Attached to the outside of the cell phone main housing is a screen 21. The screen 21 displays images. In some embodiments, the screen 21 is a touchscreen that functions as an input device as well as displaying an image. In other embodiments, the screen 21 is not a touchscreen, but user controls 25 are included to allow a user to input information into the cell phone. An antenna 23 is included for two-way communication. The antenna 23 can be either an internal antenna, located within the cell phone main housing 3, or the antenna 23 can be an external antenna that is connected to the outside of the cell phone main housing 3 but remains electrically connected to the cell phone internal mechanisms 11 and the rechargeable power storage unit.

Figure 2:
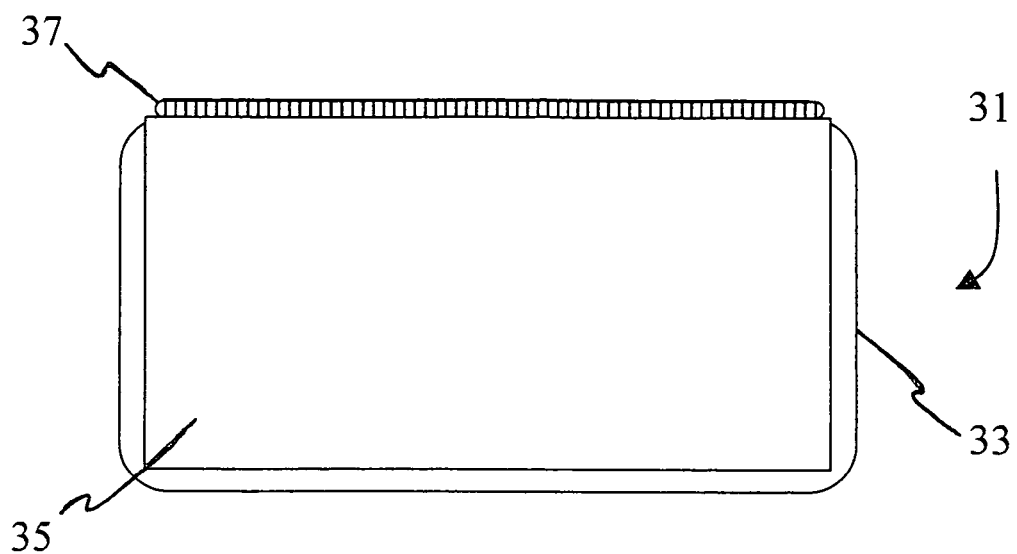
FIG. 2 is a rear elevation view of another embodiment of a present invention solar powered cell phone, in closed position.
Figure 3:
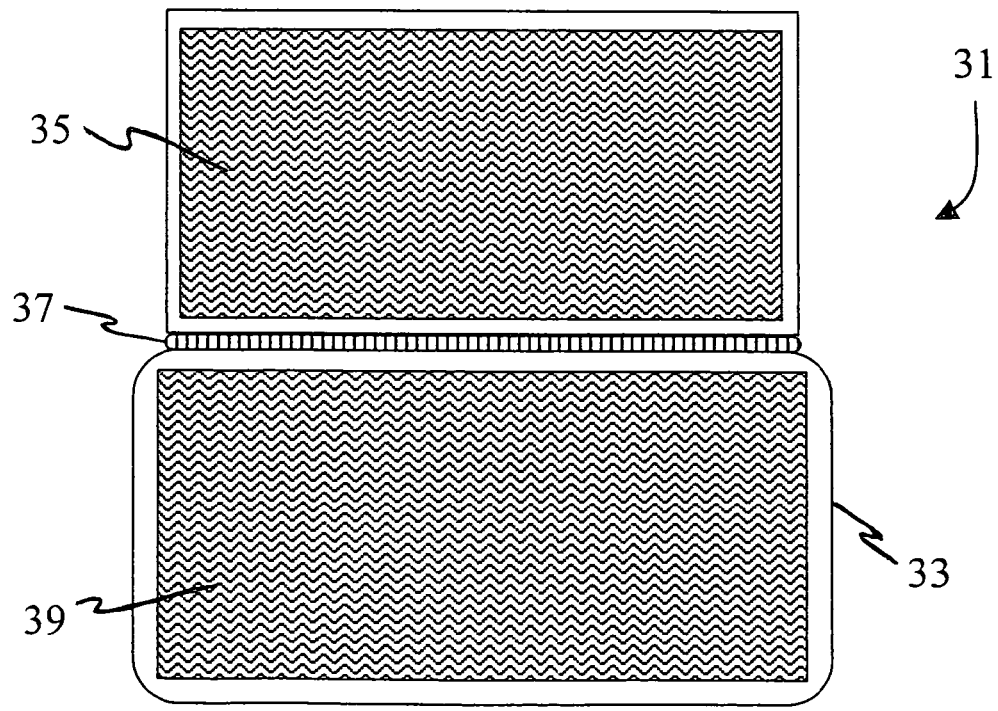
FIG. 3 is a rear elevation view of the embodiment of a present invention solar powered cell phone shown in FIG. 2, in open position.
Figure 4:
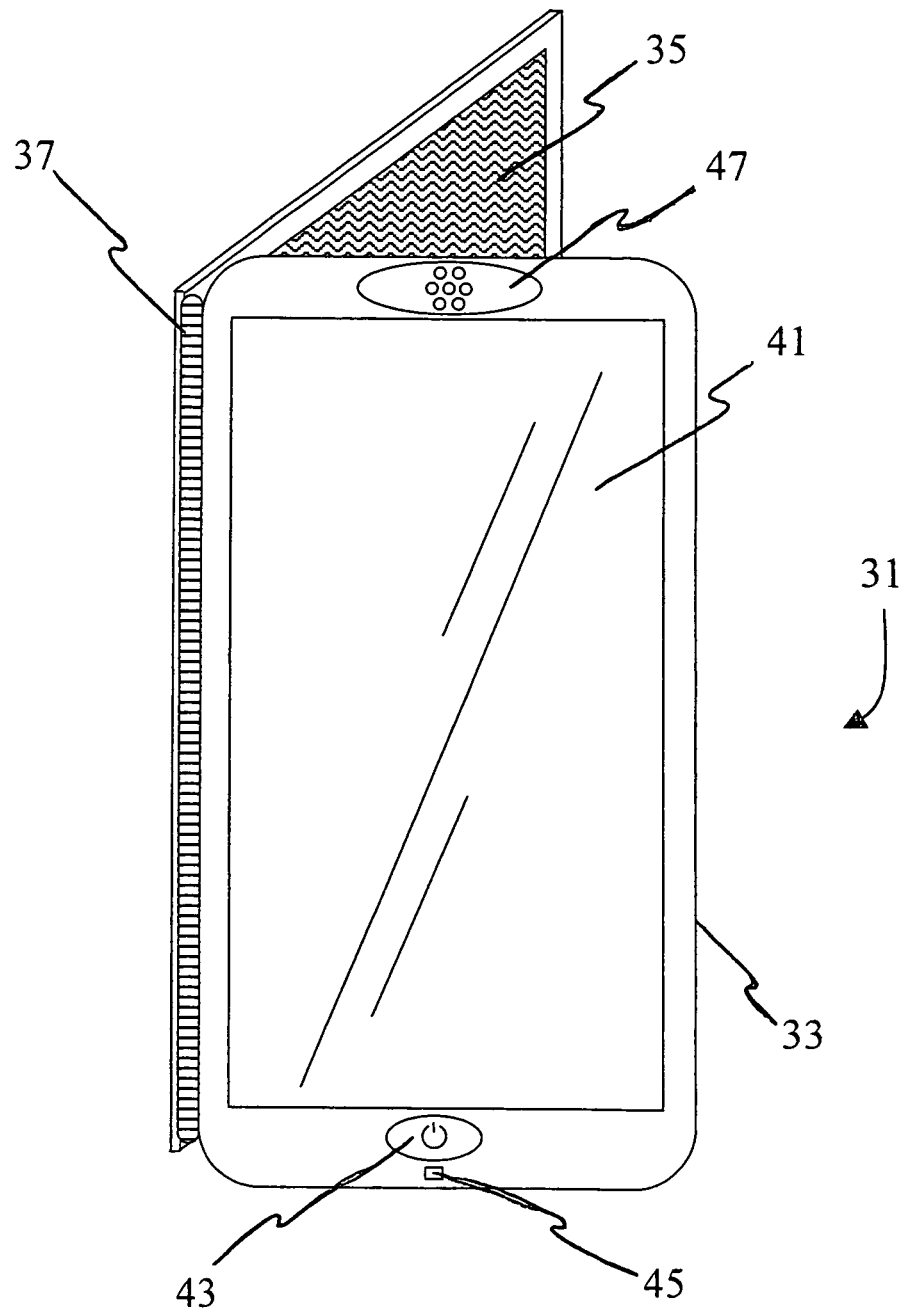
FIG. 4 is a front elevation view of the embodiment of a present invention solar powered cell phone shown in FIG. 2, in open position.

Turning now to FIGS. 2 through 4, another embodiment of the present invention solar powered cell phone is shown. A solar powered cell phone 31 includes a cell phone main housing 33. A solar cell panel 35 is attached to the cell phone main housing 33 by a hinge 37. The hinge 37 is preferably a ratcheting hinge that allows the at least one panel 35 to be set at any number of predetermined angles to maximize sun exposure. The solar cell panel 35 is both movably connected to the cell phone main housing 33 and electrically connected to the rechargeable power storage unit (not shown). As can be seen in FIG. 2, there is a second solar cell panel 39 immovably attached to the back side of the cell phone main housing 33. This solar cell panel 39 is also electrically connected to the rechargeable power storage unit so that solar energy can charge the rechargeable power storage unit. When solar cell panel 35 is unfolded from the cell phone main housing, the light-receiving surfaces of both solar panel 35 and solar panel 39 are exposed.

In some embodiments of the present invention solar powered cell phone, any solar cell panel that is not immovably fixed to the cell phone main housing has a protective backing that helps protect the at least one solar panel 35 from damage. In other embodiments, all solar cell panels have protective backings regardless of whether the solar cell panels are movably attached to the cell phone main housing or immovably attached.

FIG. 4 shows another view of the embodiment shown in FIGS. 2 and 3. Although the cell phone main housing 33 as shown in FIG. 4 contains certain features, such as screen 41, power button 43, microphone 45, and speaker 47, the invention would work on a wide range of mobile and cellular telephones. For ease of illustration and understanding, the same cell phone design and the same reference characters are used for these phone features throughout the various views. This is not meant to limit the scope of the invention to any particular phone.

In claim 2 and elsewhere throughout the application, the term "flip up movement" is used to describe the movement of a solar cell panel that is hingedly connected along one edge. Thus, as used in the present invention application, use of the word "flip" does not mean that the solar cell must end up in a reversed or upside-down orientation relative to its starting position. Likewise, use of the word "up" does not have any relation to the direction of gravity. As used herein "up" means toward an open orientation. Further, as described throughout the application, the movable solar cell panels have a first position and a second position, and are adapted to move back and forth between these two positions. Thus, even though the hinged movement is described as "flip up movement," it is to be understood that there is a corresponding flip down movement to return the solar cell panel to its original orientation.

Figure 5:
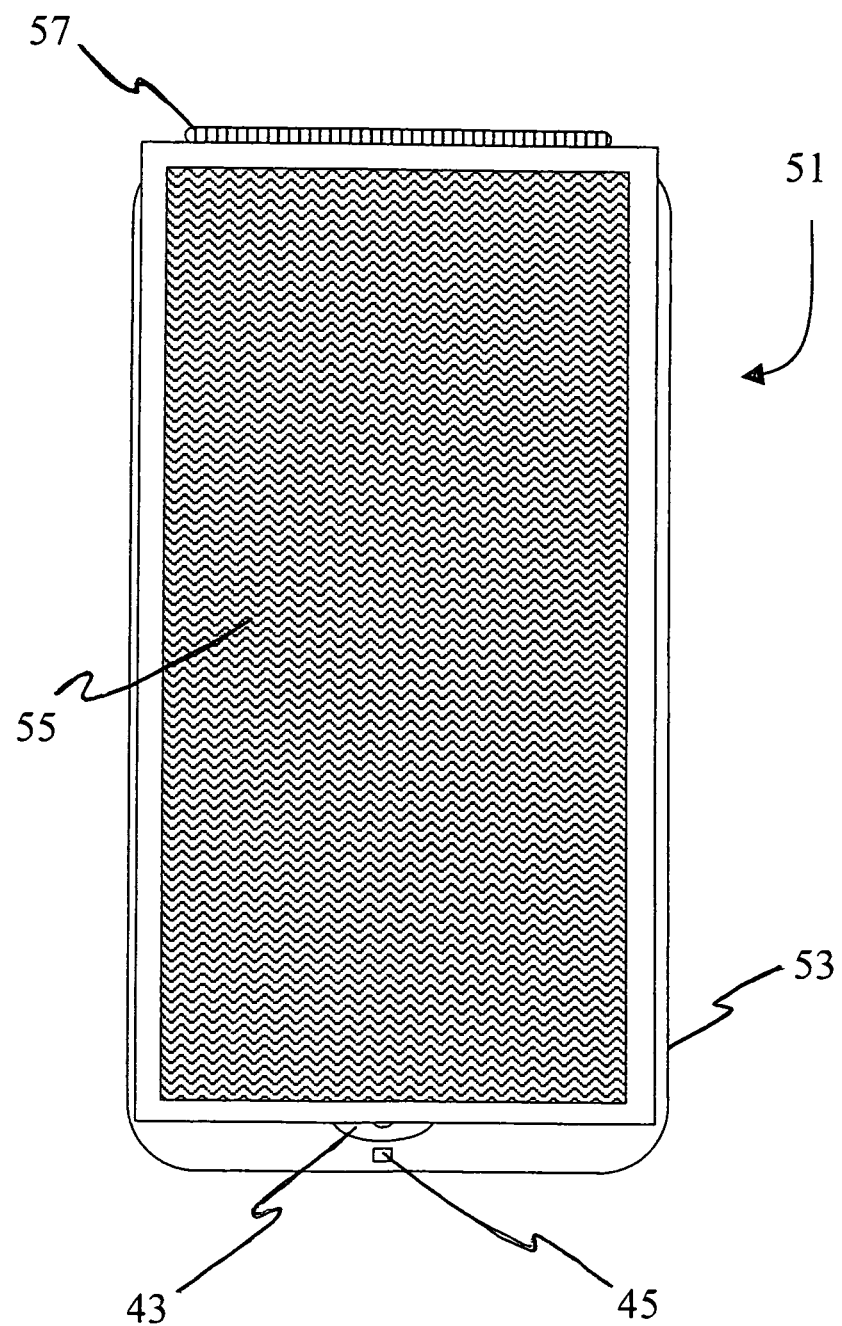
FIG. 5 is a front elevation view of another embodiment of a present invention solar powered cell phone, in closed position.
Figures 6, 7:
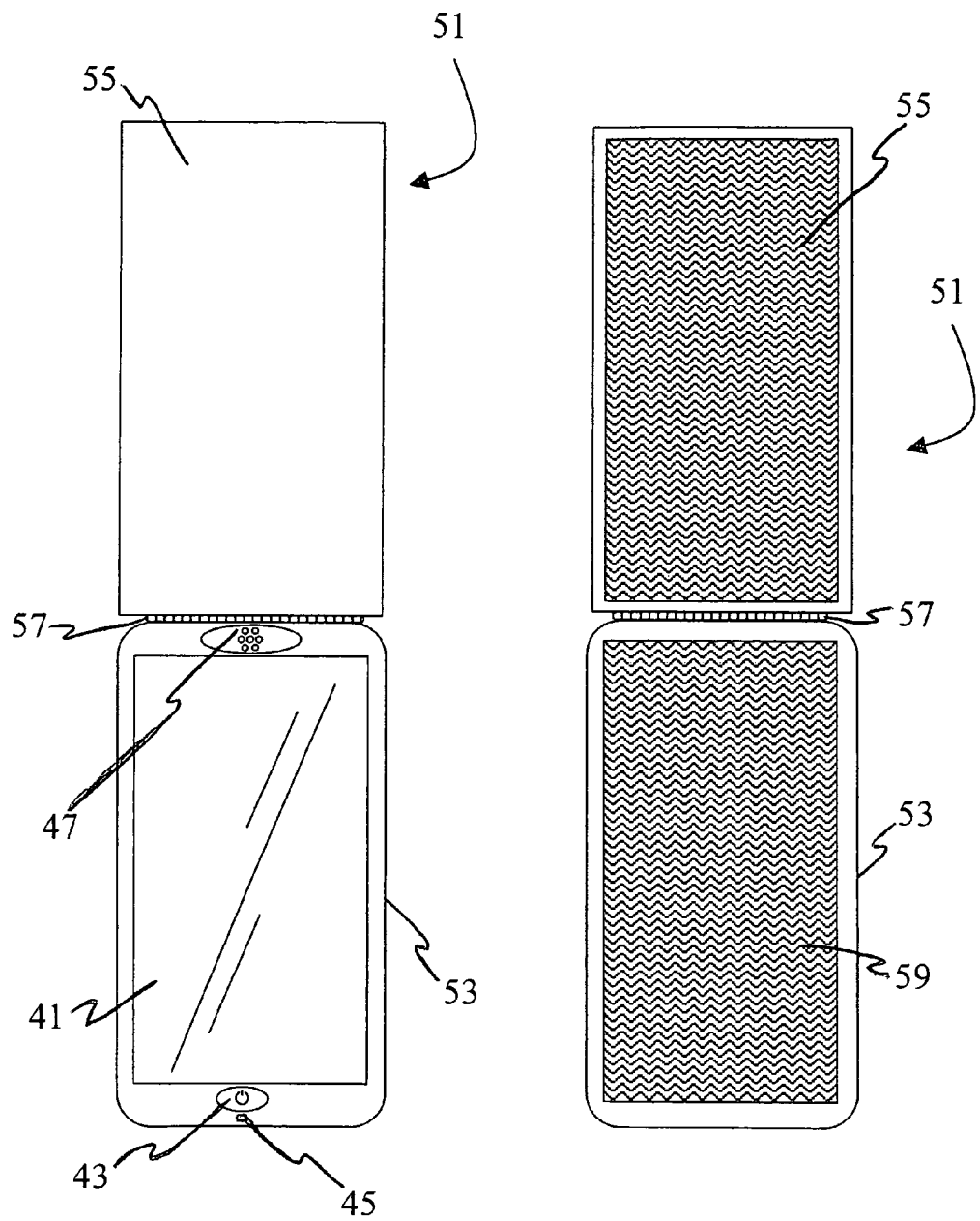
FIG. 6 is a front elevation view of the embodiment of a present invention solar powered cell phone shown in FIG. 5, in open position.
FIG. 7 is a rear elevation view of the embodiment of a present invention solar powered cell phone shown in FIG. 5, in open position.

Turning now to FIGS. 5 through 7, another embodiment of the present invention solar powered cell phone is shown. A solar powered cell phone 51 includes a cell phone main housing 53 and at least one solar cell panel 55 attached to the cell phone main housing 53 by a hinge 57. Unlike the embodiments shown in FIGS. 2 through 4, the hinge 57 connecting the at least one solar cell panel 55 to the cell phone main housing 53 is located on a shorter edge of the cell phone main housing 53. Again, any type of cell phone may be used; the present invention solar powered camera is not restricted to any particular size or style of cell phone. The hinge 57 is preferably a ratcheting hinge that allows the solar cell panel 55 to be set at any number of predetermined angles.

FIG. 6 is a front view of the solar powered cell phone 51 in open position. Throughout the specification and claims, an open position means any position which is not a completely closed position—partially open arrangements are considered to be an open position. It follows that there are numerous or even infinite open positions for a given embodiment, but only one closed position for each embodiment. In the embodiment shown in FIGS. 5 through 7, the cells of the solar cell panel 55 are exposed when the solar powered cell phone 51 is in the closed position, shown in FIG. 5. In FIG. 6, the solar cell panel 55 has been flipped up, so as to be approximately co-planar with the cell phone main housing 53. As shown in FIG. 7, solar cell panel 59 is attached to the back of cell phone main housing 53. Thus, in the arrangement shown in FIGS. 6 and 7, the solar powered cell phone 51 can be laid down on a surface, preferably a surface that will not abrade the screen 41 of solar powered cell phone 51. In order to facilitate cell phone usage, in some embodiments, solar cell panel 55 can continue to rotate around hinge 57 until the light-receiving faces of solar cell panel 55 and solar cell panel 59 touch.

Turning now to FIGS. 8 and 9, another embodiment of the present invention solar powered cell phone is shown. As shown in FIGS. 8 and 9, solar powered cell phone 61 includes a cell phone main housing 33, a screen 41, a power button 43, a microphone 45, and a speaker 47. A solar cell panel 63 is affixed to the back of cell phone main housing 33. Two tracks 67A and 67B are permanently attached to the back side of cell phone main housing 33. A second solar cell panel 65 has two rails 69A and 69B, which slide within tracks 67A and 67B. This allows solar cell panel 65 to slide back and forth over solar cell panel 63.

Figure 10:
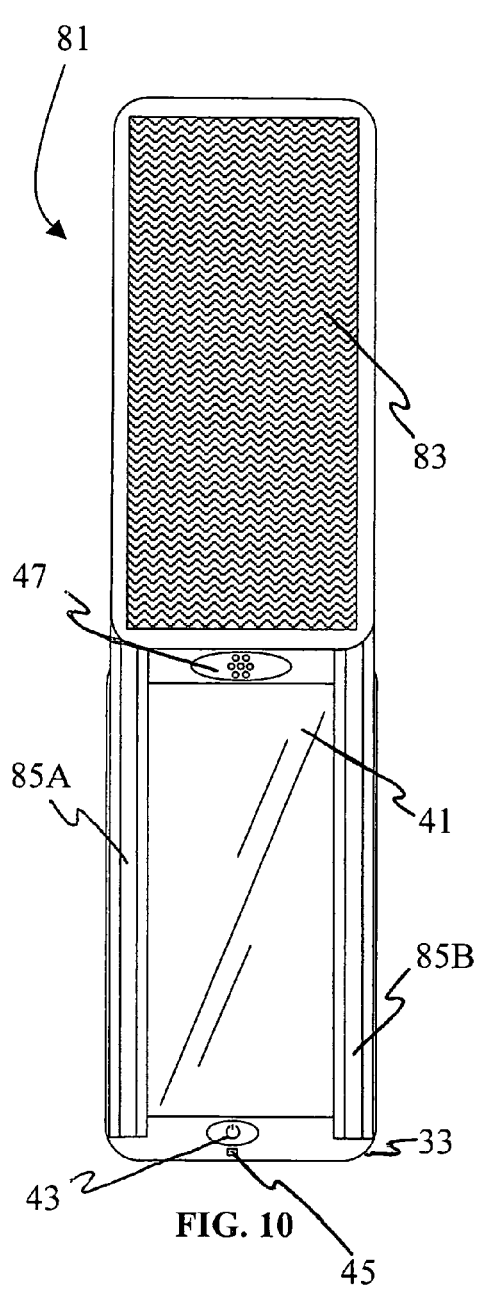
FIG. 10 is a front elevation view of another embodiment of a present invention solar powered cell phone, in open position.
Figure 11:
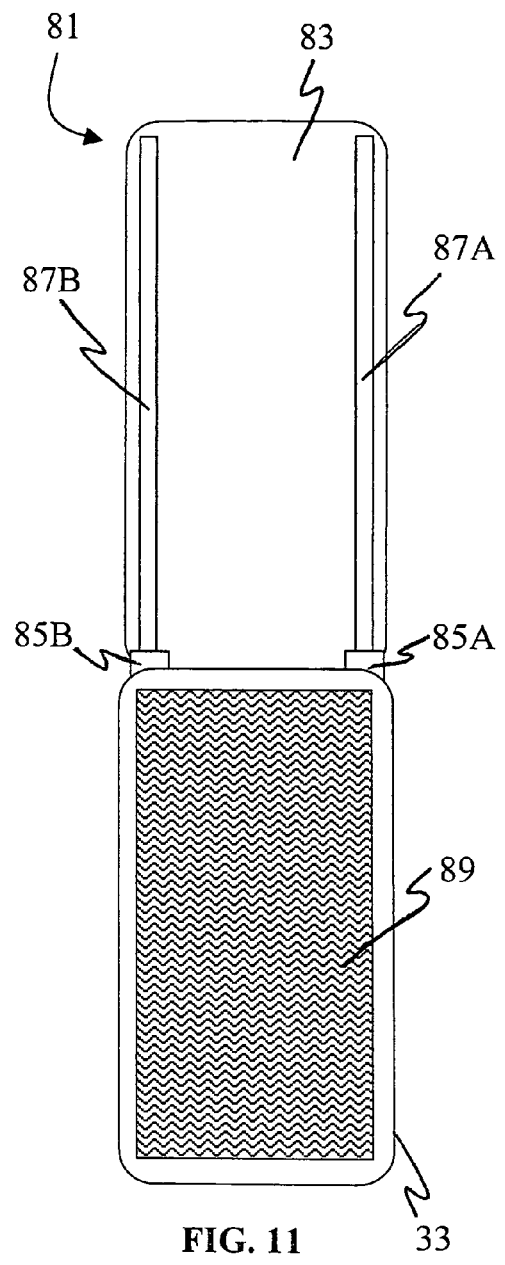
FIG. 11 is a rear elevation view of the embodiment of a present invention solar powered cell phone shown in FIG. 10, in open position.
Figure 12:
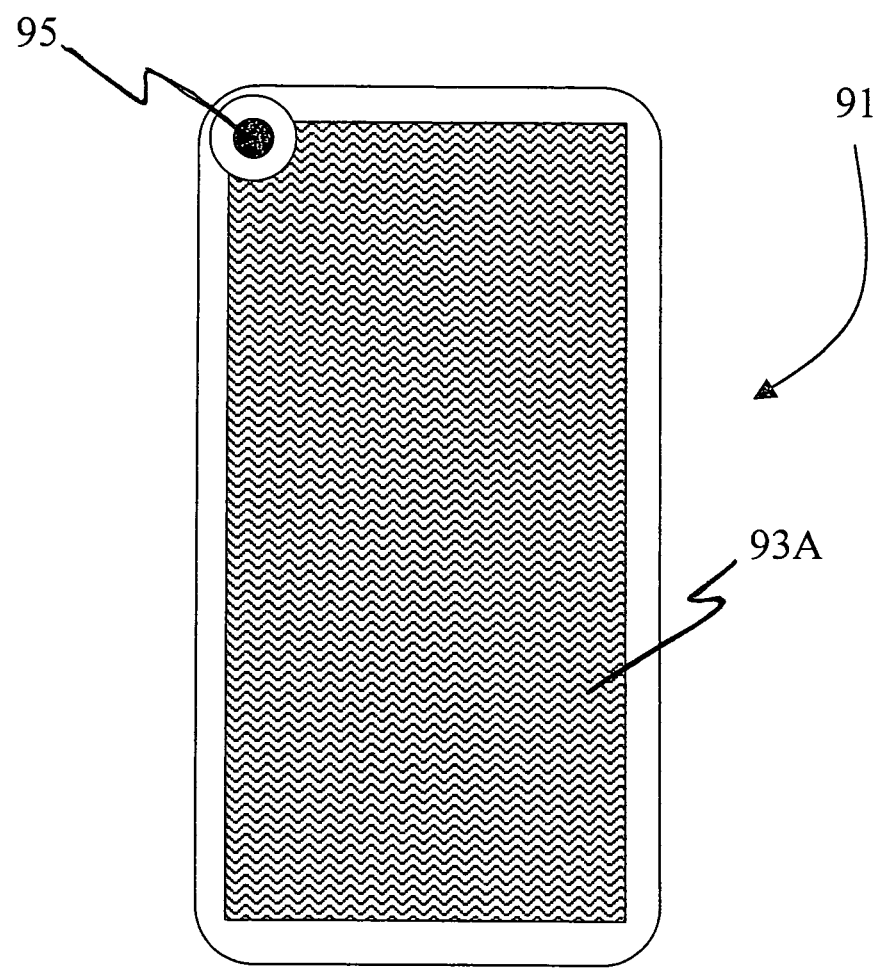
FIG. 12 is a rear elevation view of another embodiment of a present invention solar powered cell phone, in closed position.

Turning now to FIGS. 10 and 11, another embodiment of the present invention solar powered cell phone is shown. As shown in FIGS. 10 and 11, solar powered cell phone 81 includes a cell phone main housing 33, a screen 41, a power button 43, a microphone 45, and a speaker 47. A solar cell panel 89 is affixed to the back of cell phone main, housing 33. Two tracks 85A and 85B are permanently attached to the front side of cell phone main housing 33. A second solar cell panel 65 has two rails 87A and 87B, which slide within tracks 85A and 85B. This allows solar cell panel 65 to slide back and forth over the screen 41.

In any embodiments which include a solar panel, such as solar panel 83, which slides on at least one track and rail, a mechanism (not shown) can be included to prevent the solar panel from sliding back toward its closed position. This mechanism can either be a locking mechanism, which would require activation of a release mechanism to return the solar panel to its closed position, or a high-friction area of the track and rail, that would engage when the solar cell panel was fully extended and that would require additional force to overcome when returning the solar cell panel to its closed position.

Figure 13:
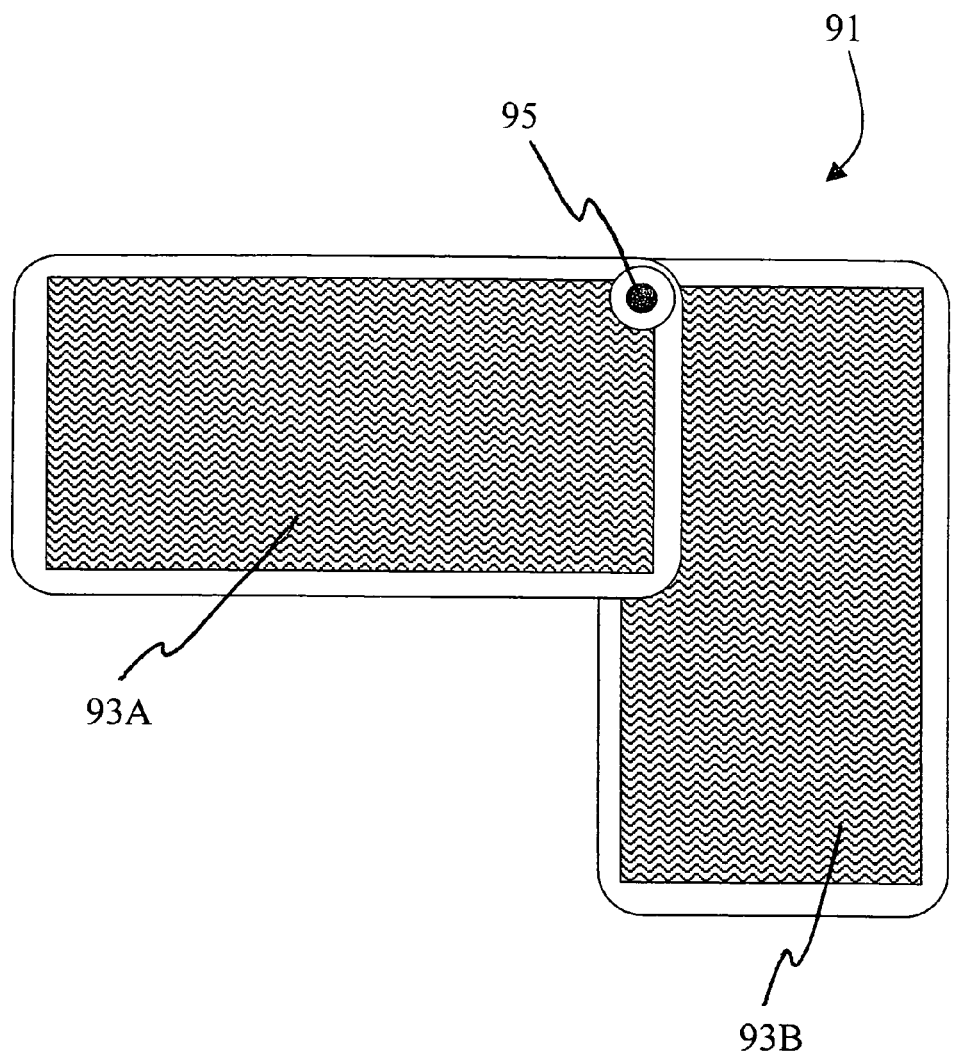
FIG. 13 is a rear elevation view of the embodiment of a present invention solar powered cell phone shown in FIG. 12, in open position.
Figure 14:
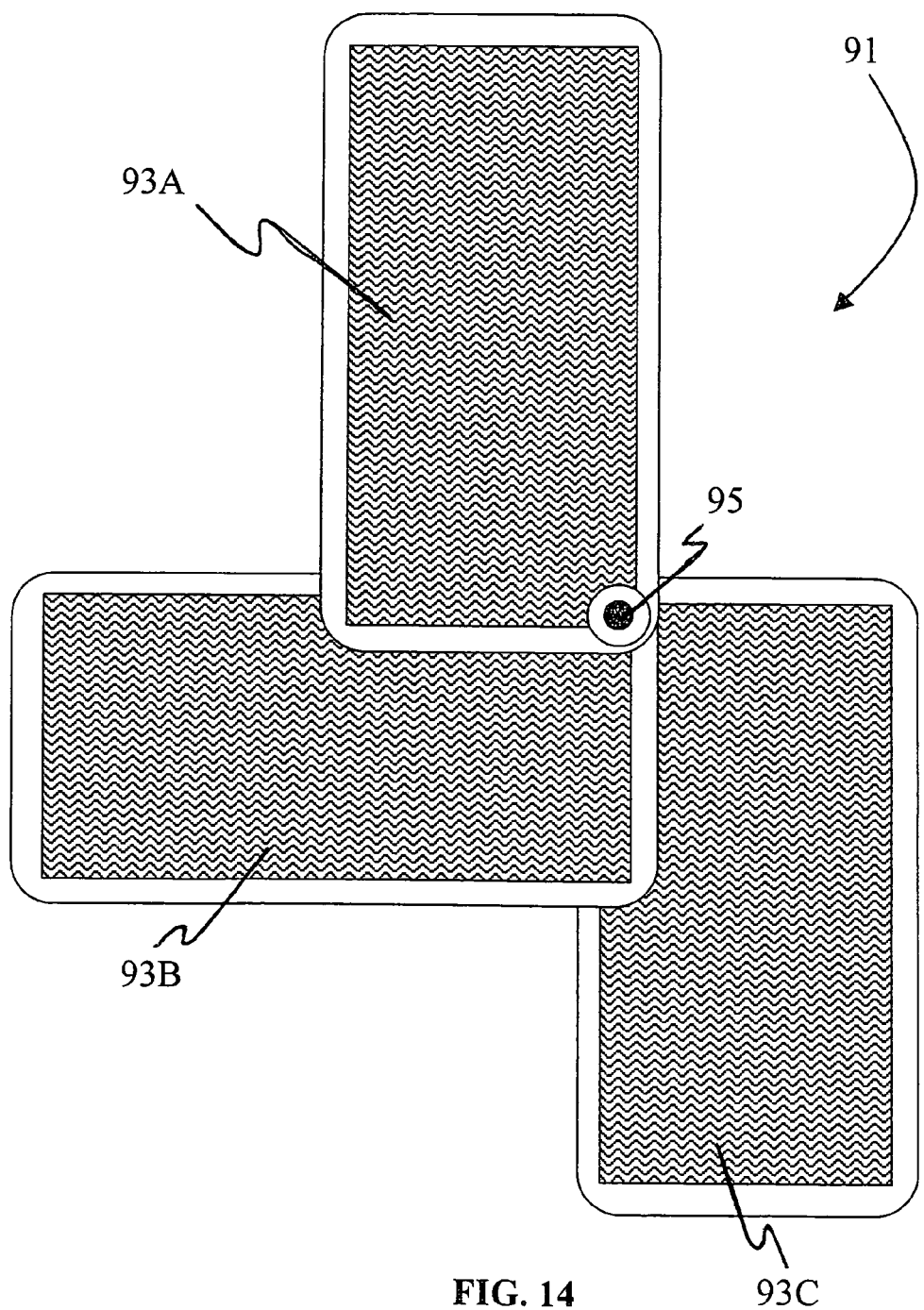
FIG. 14 is a rear elevation view of the embodiment of a present invention solar powered cell phone shown in FIG. 12, in open position.
Figure 15:
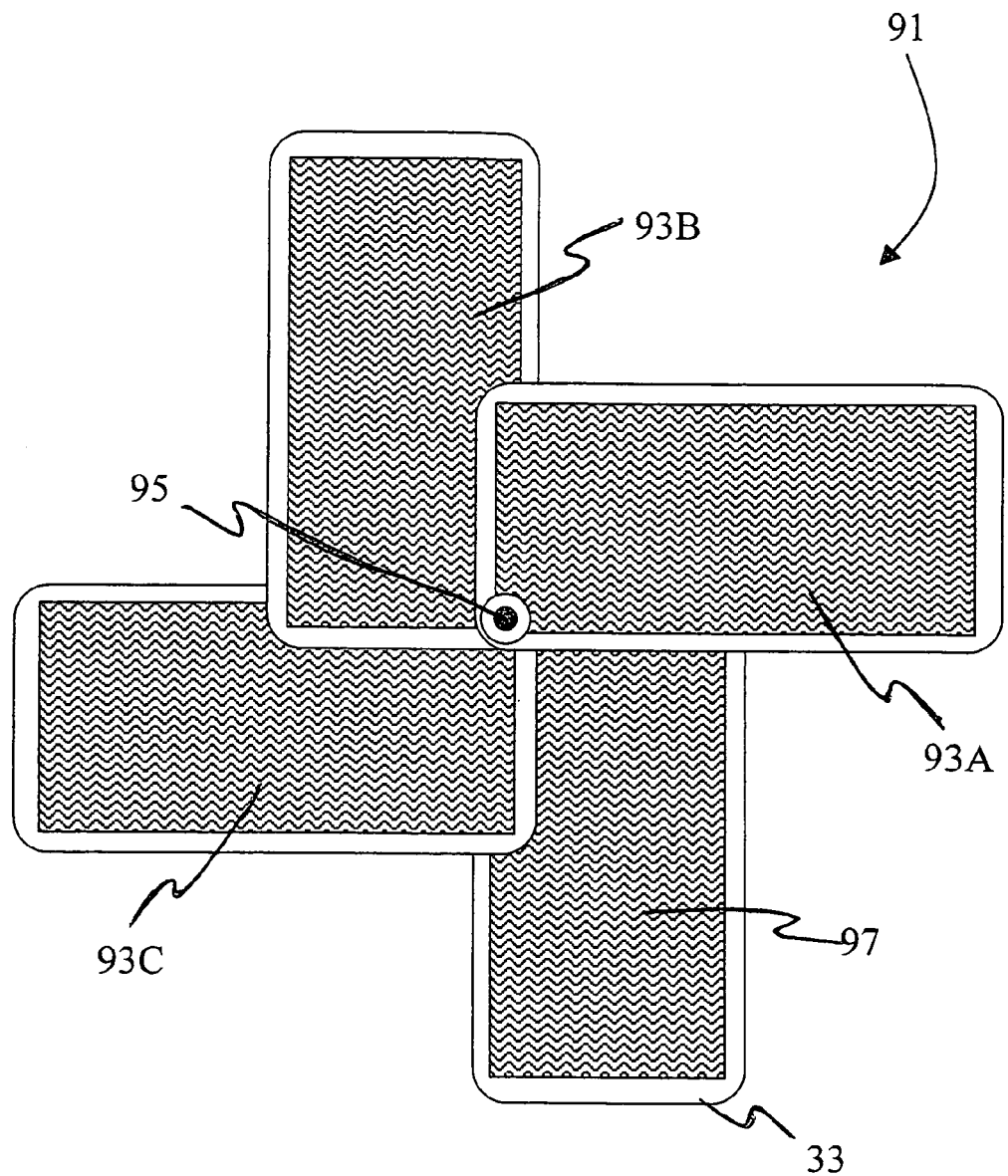
FIG. 15 is a rear elevation view of the embodiment of a present invention solar powered cell phone shown in FIG. 12, in open position.

Turning now to FIGS. 12 through 16, another embodiment of the present invention solar powered cell phone is shown. A solar powered cell phone 91 includes a solar cell panel 93A, which rotates around pivot point 95. Reference to FIG. 13 shows that as solar cell panel 93A is rotated around the pivot point 95, solar cell panel 93B is exposed. As solar cell panels 93A and 93B are rotated around pivot point 95, solar cell panel 93C is exposed, as shown in FIG. 14. FIG. 15 shows that as solar cell panels 93A, 93B, and 93C are rotated around pivot point 95, solar cell panel 97 is exposed. Solar cell panel 97 is affixed to the back side of the cell phone main housing 33. Although only three moving solar cell panels 93A, 93B, and 93C are shown, any number of moving solar cell panels can be used. Solar cell panels 93A, 93B, and 93C are shown as rectangular, but any shape of solar cell panel can be used. The shapes include, but are not limited to, circular, oblong, oval, triangular, square, and any type of regular or irregular polygon. The shape of the solar panels can even be a completely irregular shape that cannot be defined by simple geometric shapes.

Figure 16:
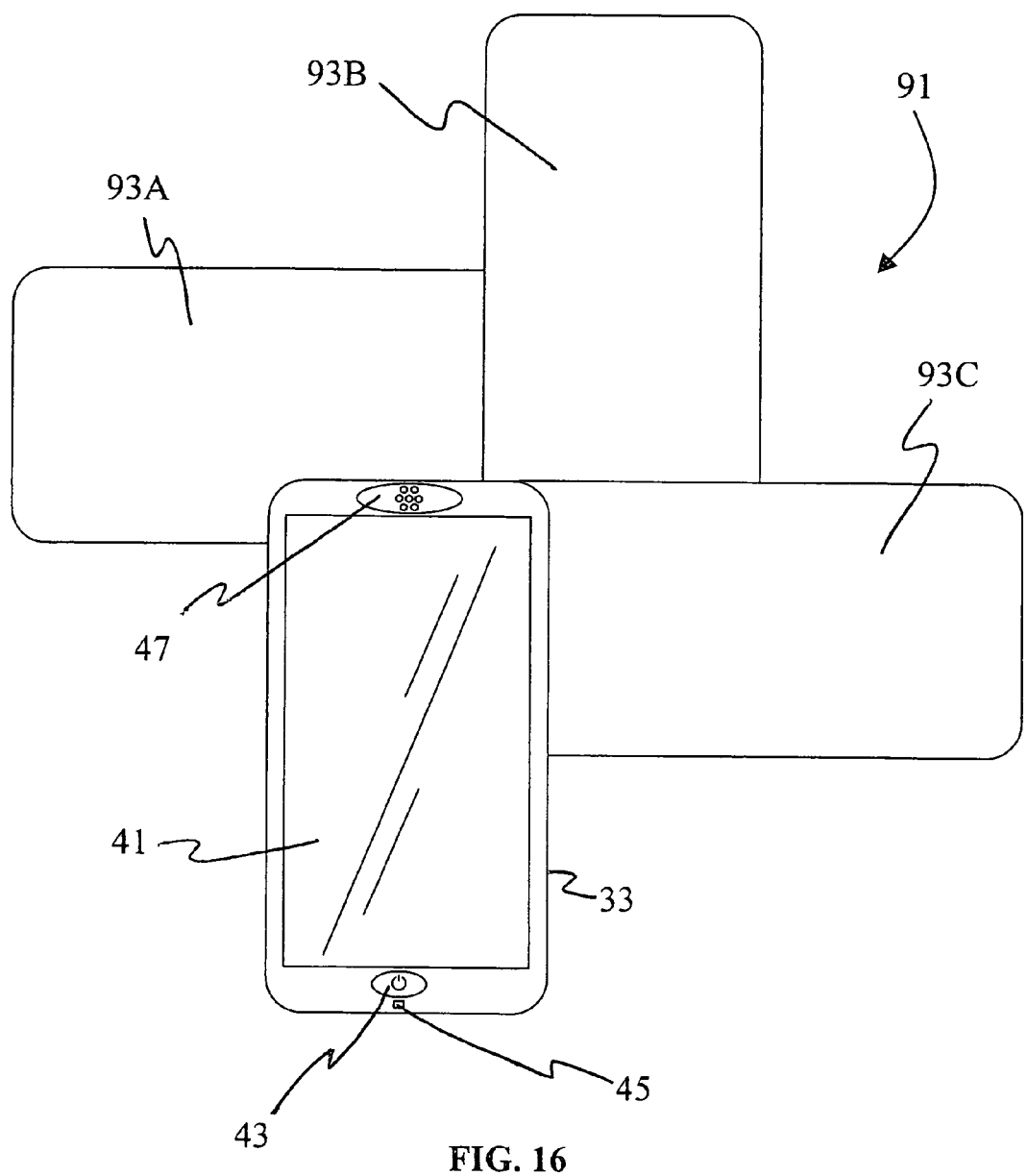
FIG. 16 is a front elevation view of the embodiment of a present invention solar powered cell phone shown in FIG. 12, in open position.

FIG. 16 shows another view of the embodiment of the present invention solar powered cell phone shown in FIGS. 12 through 15. In this view, the front of the phone is shown, including screen 41, power button 43, microphone 45, and speaker 47. Applicant notes again that while for ease of illustration, a single cell phone design is shown, the invention is not limited to any particular type of phone design. Furthermore, while certain features of the phone, such as a screen, power button, and so forth are shown throughout the various views, even phones that lack these components could be adapted as present invention solar powered cell phone. The functionality of the cell phone is not material to the patentability of the present invention.

Figure 17:
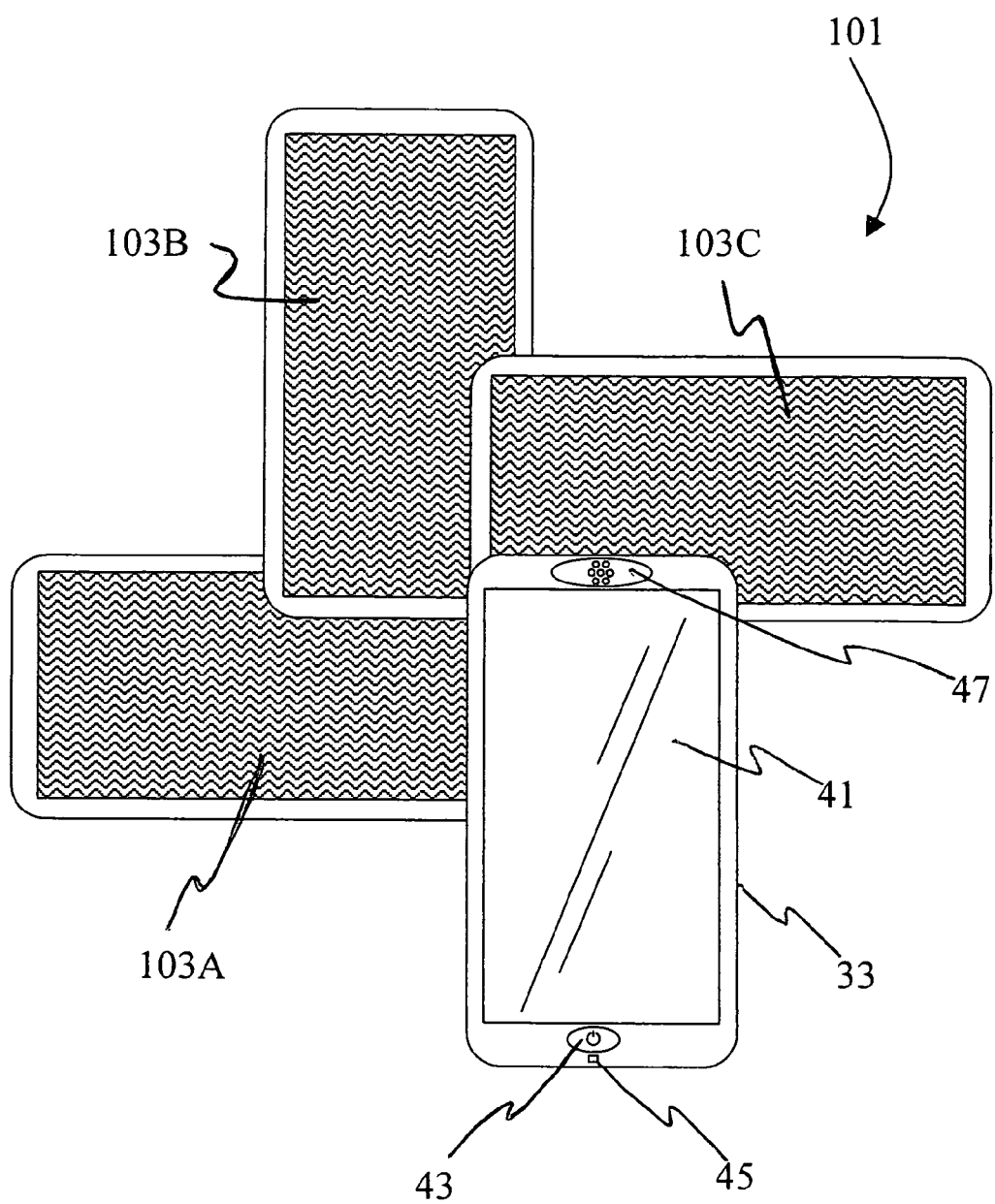
FIG. 17 is a front elevation view of another embodiment of a present invention solar powered cell phone, in open position.
Figure 18:
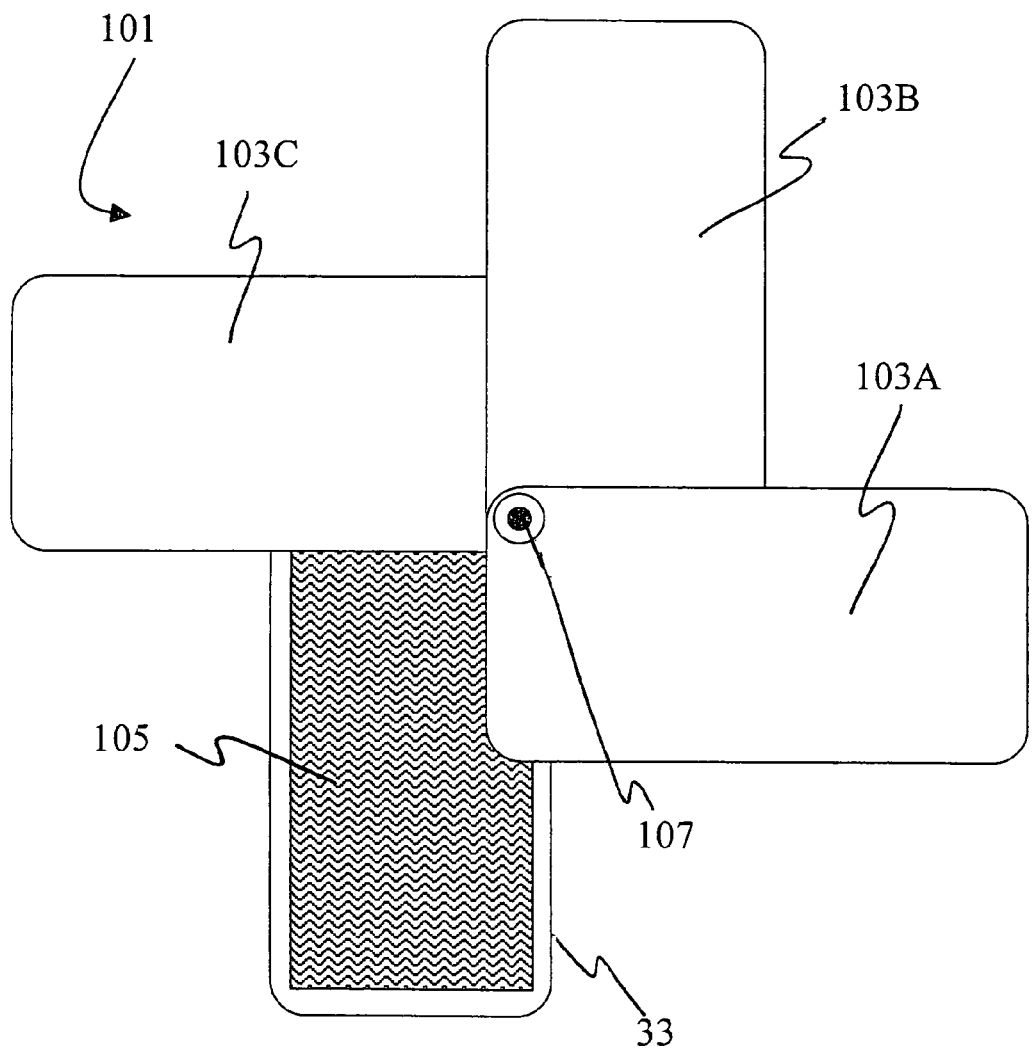
FIG. 18 is a rear elevation view of the embodiment of a present invention solar powered cell phone shown in FIG. 17, in open position.
Figure 19:
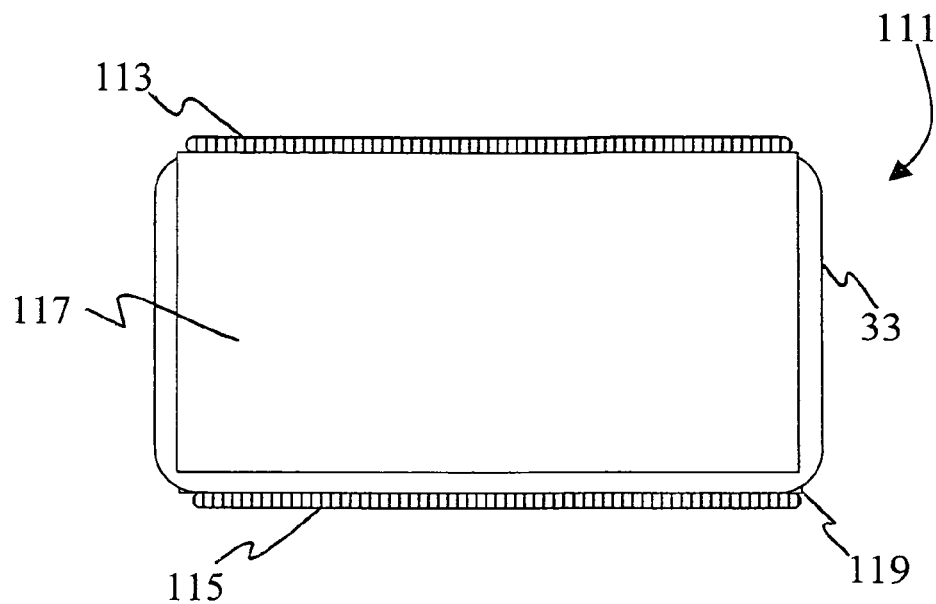
FIG. 19 is a front elevation view of another embodiment of a present invention solar powered cell phone, in closed position.
Figure 20:
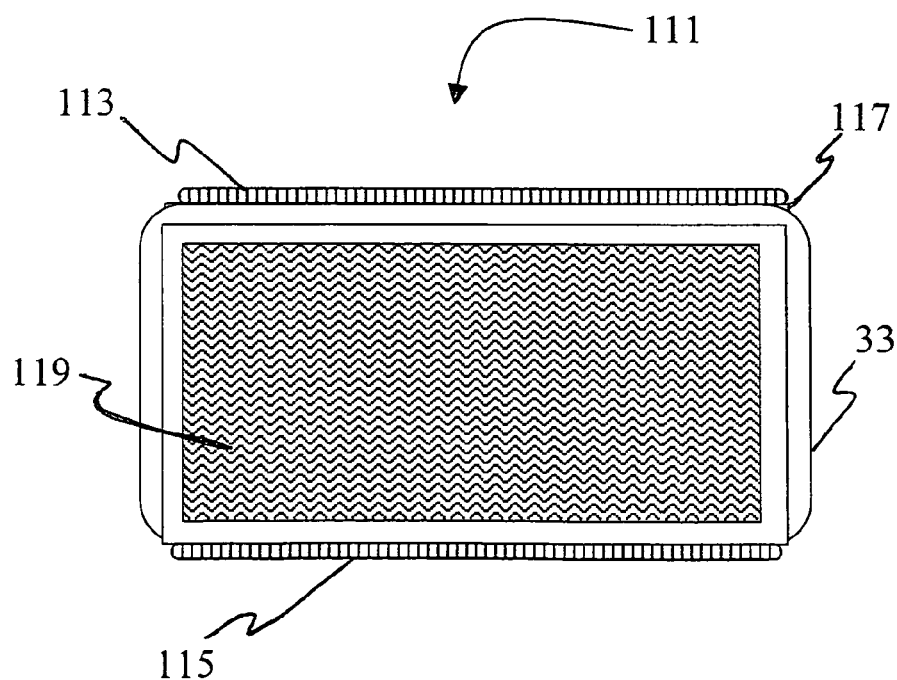
FIG. 20 is a rear elevation view of the embodiment of a present invention solar powered cell phone shown in FIG. 19, in closed position.

Turning now to FIGS. 17 and 18, another embodiment of the present invention solar powered cell phone is shown. A solar powered cell phone 101 includes a cell phone main housing 33 having a screen 41, a power button 43, a microphone 45, and speaker 47. The solar cell panels in FIGS. 17 and 18 rotate around a pivot point 107. In the embodiments shown in FIGS. 17 and 18, the screen 41 faces the same direction as the light-receiving sides of the movable solar cell panels 103A, 103B, and 103C. This arrangement allows the solar powered cell phone to continue to charge while the screen remains in a usable position. In the embodiment shown in FIG. 18, a solar cell panel 105 is affixed to the back of the cell phone main housing. In other embodiments, solar cell panel 105 is not included; only movable solar cell panels 103A, 103B, and 103C are included. In still other embodiments, there are one, two, four, or more movable solar cell panels.

Turning now to FIGS. 19 through 22, another embodiment of the present invention solar powered cell phone is shown. A solar powered cell phone 111 includes a cell phone main housing 33. A solar cell panel 117 is movably attached to cell phone main housing 33 via a hinge 113. Likewise, solar cell panel 119 is movably attached to cell phone main housing 33 via a hinge 115. The hinges 113 and 115 are preferably ratcheting hinges that allow solar cell panels 117 and 119 to be set at any number of predetermined angles. In this embodiment, in the closed position shown in FIGS. 19 and 20, the light-receiving side of solar cell panel 119 is exposed and the light-receiving side of solar cell panel 117 is hidden.

Figure 21:
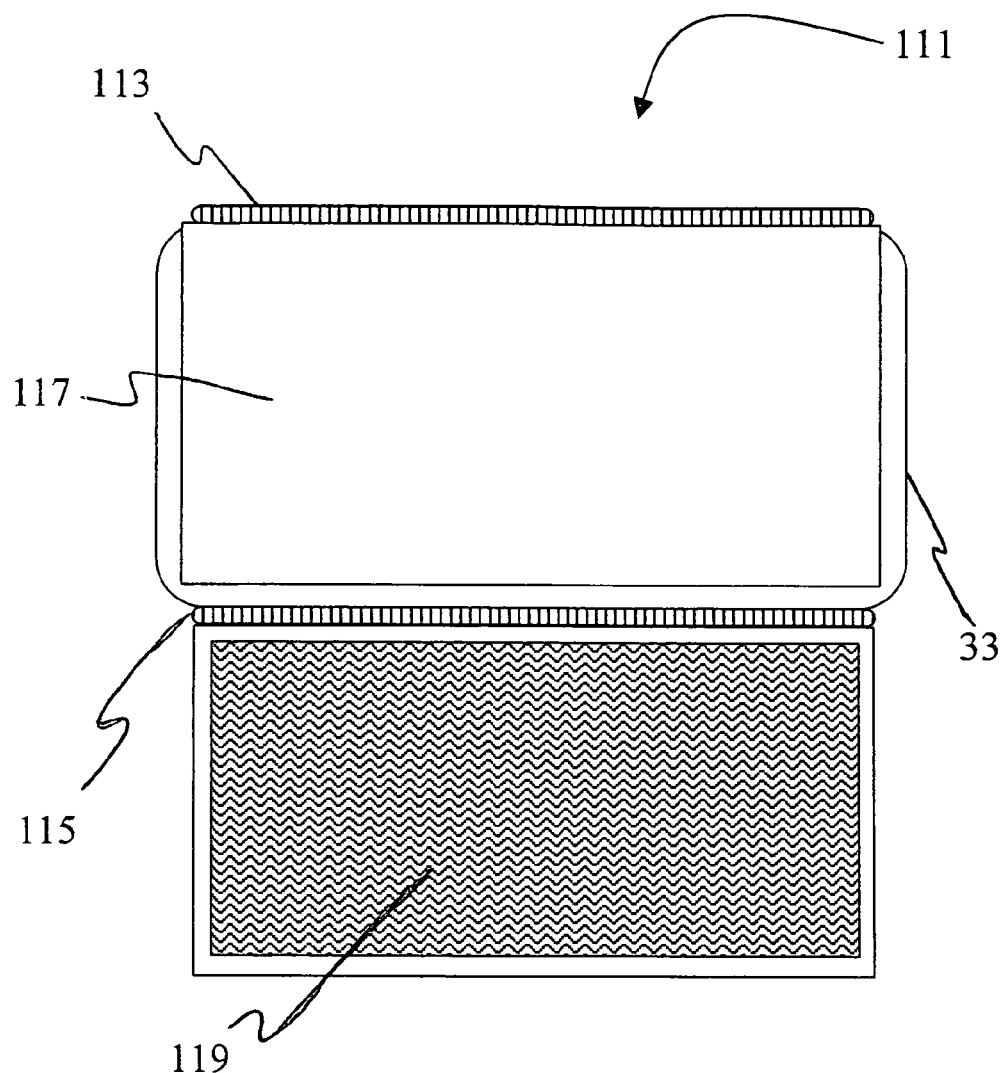
FIG. 21 is a front elevation view of the embodiment of the present invention solar powered cell phone shown in FIG. 19, in open position.
Figure 22:
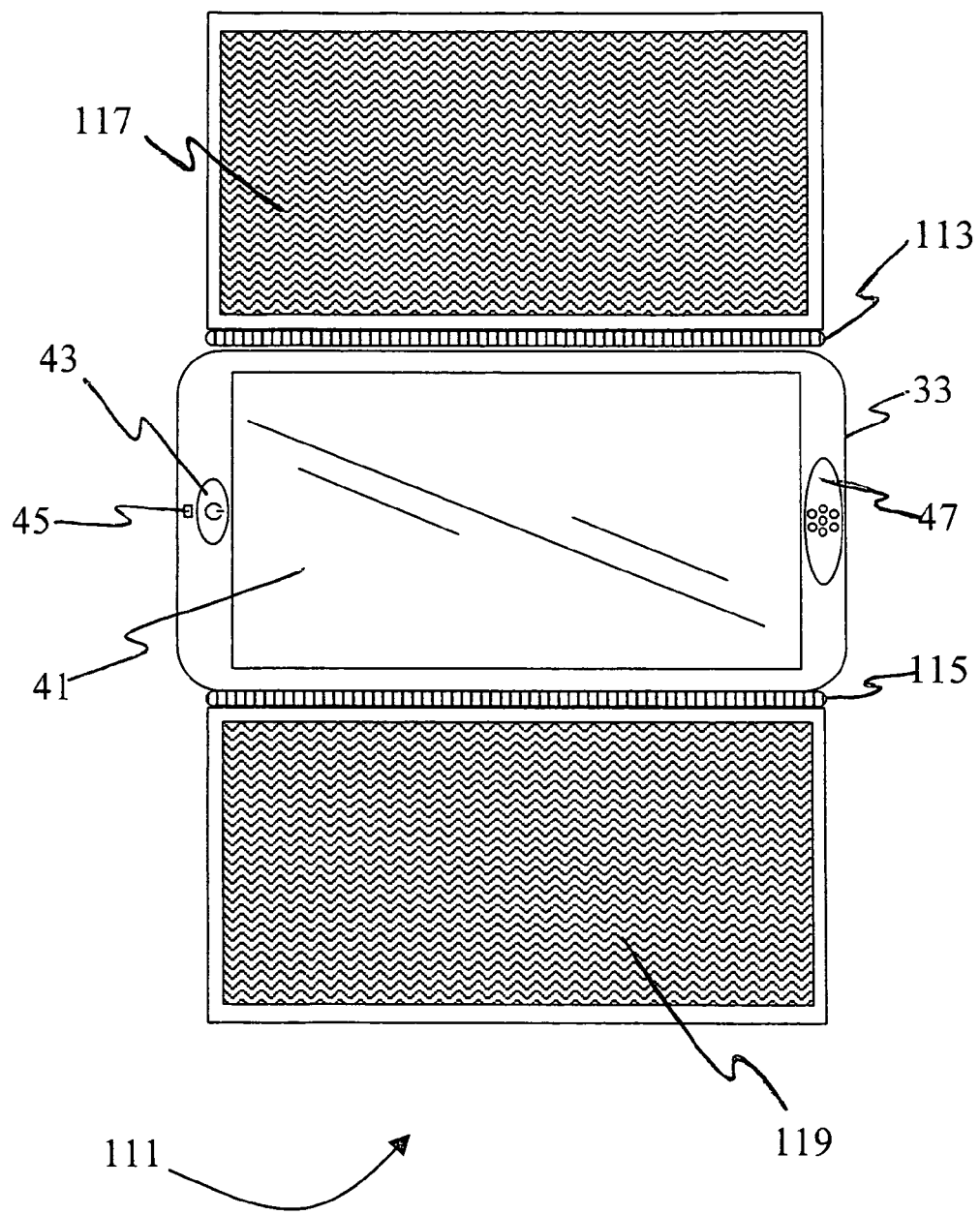
FIG. 22 is a front elevation view of the embodiment of the present invention solar powered cell phone shown in FIG. 19, in open position.

As shown in FIG. 21, solar cell panel 119 is unfolded while solar cell panel 117 remains folded. In FIG. 22, both solar cell panel 117 and solar cell panel 119 are unfolded. The screen 41 faces in the same direction as the light-receiving surfaces of solar panels 117 and 119.

Figure 23:
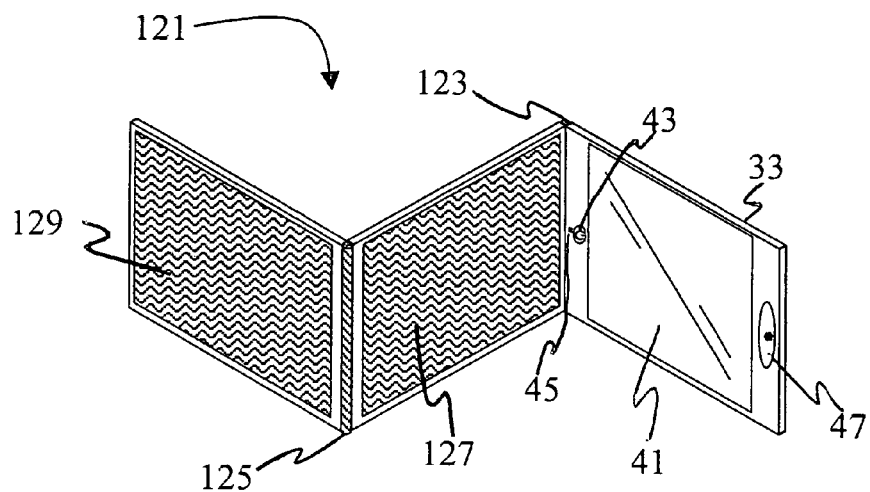
FIG. 23 is a perspective view of another embodiment of a present invention solar powered cell phone.
Figure 24:
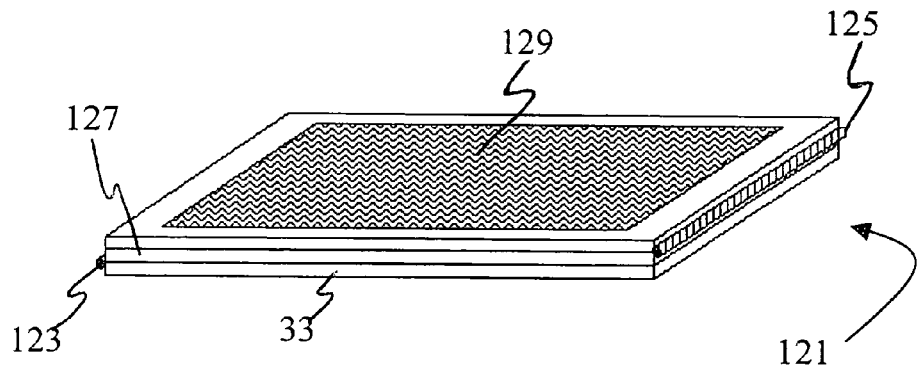
FIG. 24 is a perspective view of the embodiment of a present invention solar powered cell phone shown in FIG. 23, in closed position.
Figure 25:
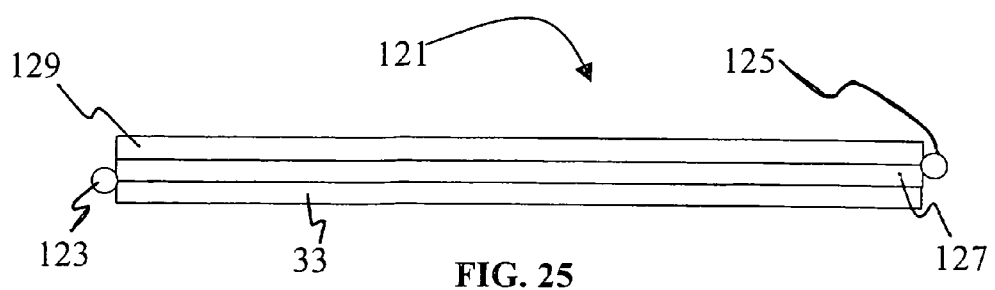
FIG. 25 is a side elevation view of the embodiment of a present invention solar powered cell phone shown in FIG. 23, in closed position.

Another embodiment of the present invention solar powered cell phone is shown in FIGS. 23 through 25. A solar powered cell phone 121 includes a cell phone main housing 33. The cell phone main housing includes a screen 41, a power button 43, a microphone 45, and a speaker 47. Solar cell panel 127 is movably attached to cell phone main housing 33 via a hinge 123. Solar cell panel 129 is movably attached to solar cell panel 127 via a hinge 125. The arrangement of the hinges allows the solar cell panels 127 and 129 to be stacked with cell phone main housing 33. When in the stacked arrangement shown in FIGS. 24 and 25, the light-receiving face of solar cell panel 129 is exposed, allowing the solar powered cell phone 121 to charge.

Figure 26:
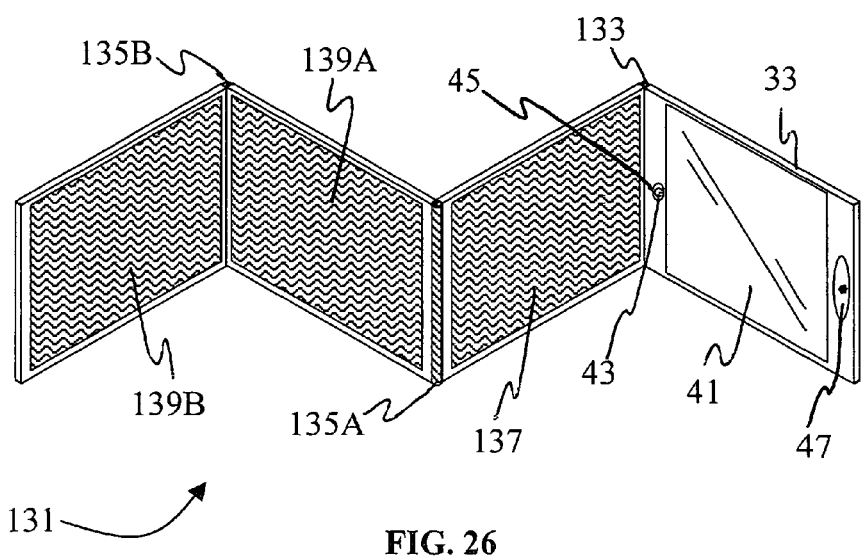
FIG. 26 is a perspective view of another embodiment of a present invention solar powered cell phone.
Figure 27:
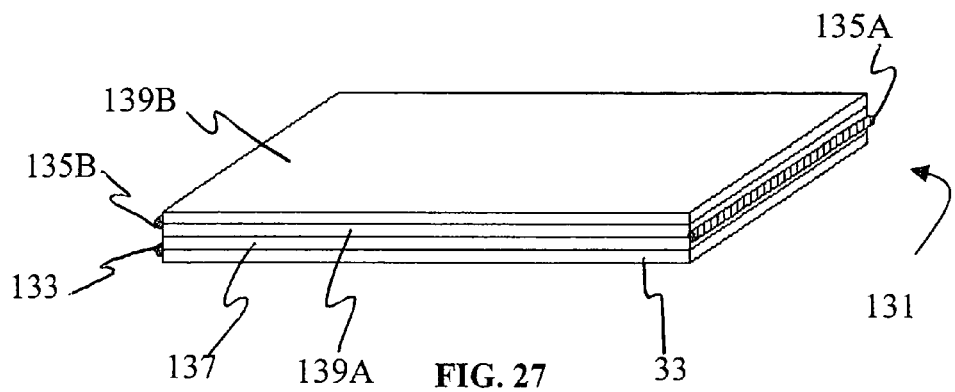
FIG. 27 is a perspective view of the embodiment of a present invention solar powered cell phone shown in FIG. 26, in closed position.
Figure 28:
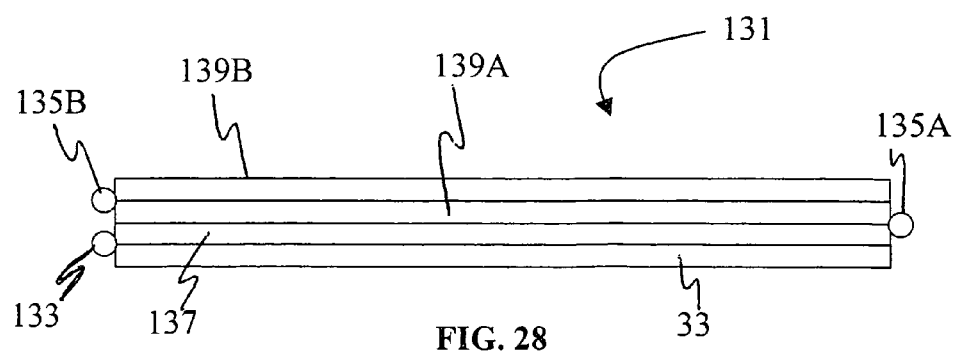
FIG. 28 is a side elevation view of the embodiment of a present invention solar powered cell phone shown in FIG. 26, in closed position.
Figure 29:
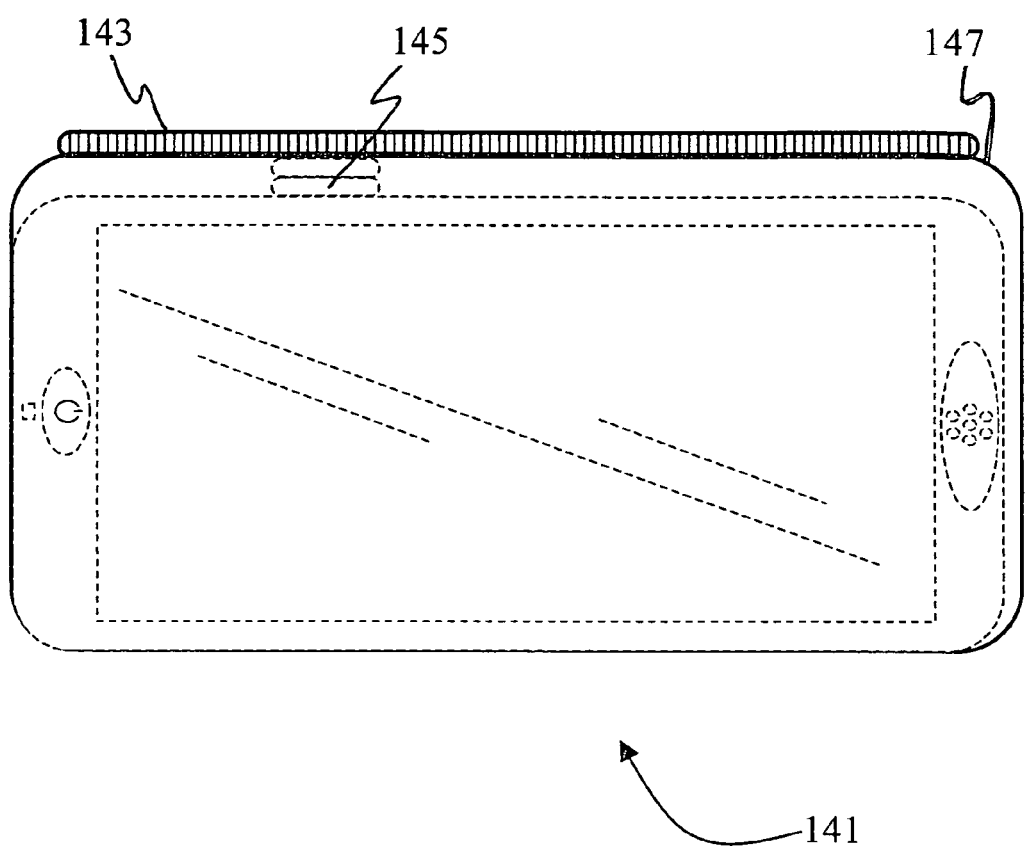
FIG. 29 is a front elevation view of another embodiment of a present invention solar powered cell phone, in closed position.

Turning now to FIGS. 26 through 28, another embodiment of the present invention solar powered cell phone is shown. A solar powered cell phone 131 includes a cell phone main housing 33. The cell phone main housing includes a screen 41, a power button 43, a microphone 45, and a speaker 47. Solar cell panel 137 is movably attached to cell phone main housing 33 via a hinge 133. Solar cell panel 139A is movably attached to solar cell panel 137 via a hinge 135A. Solar cell panel 139B is movably attached to solar cell panel 139A via a hinge 135B. The arrangement of the hinges allows the solar cell panels 137,139A, and 139B to be stacked with cell phone main housing 33. Any number of additional panels (e.g. 139C, 139D, etc.), not pictured, can be strung together by additional hinges (e.g. 135C. 135D, etc.), not pictured.

Figure 30:
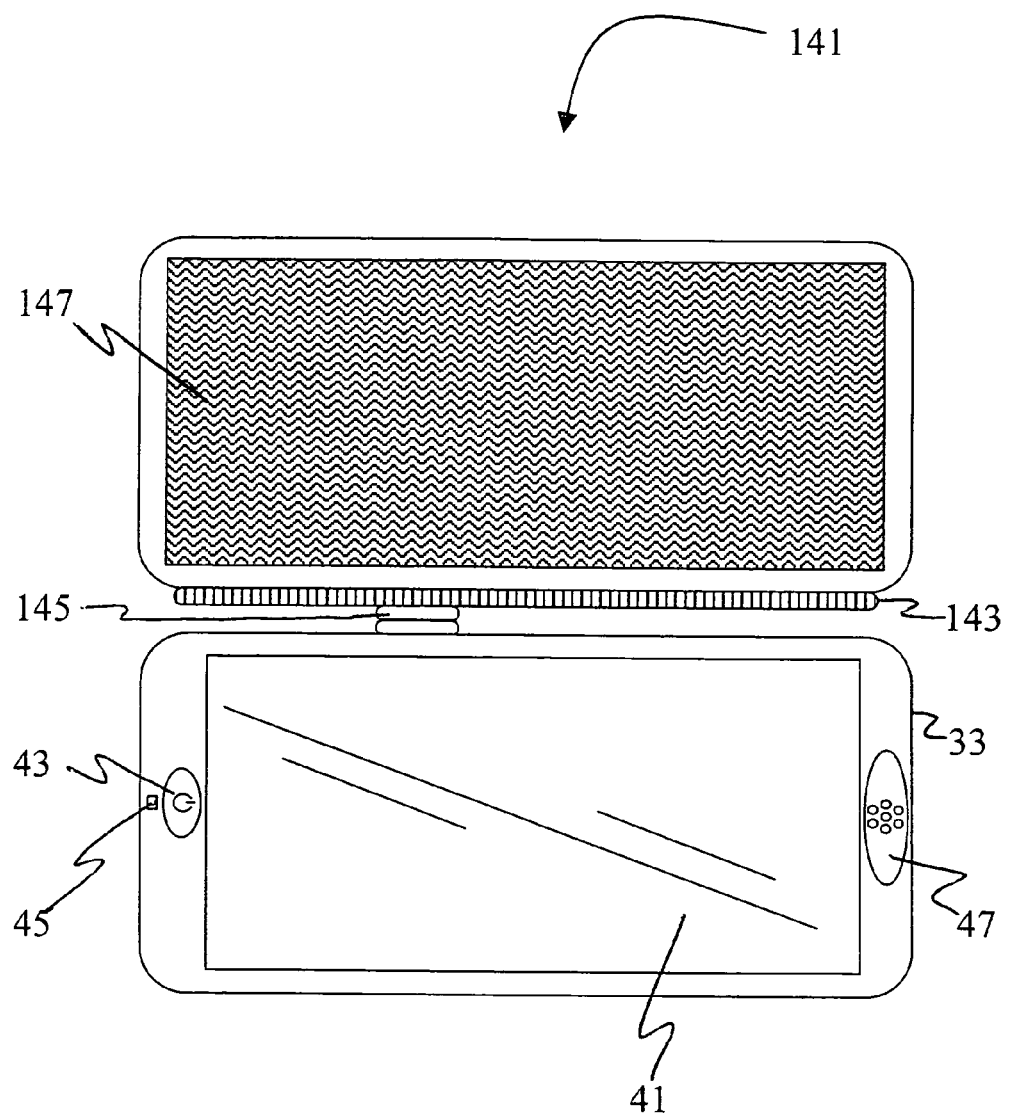
FIG. 30 is a front elevation view of the embodiment of a present invention solar powered cell phone shown in FIG. 29, in open position.
Figure 31:
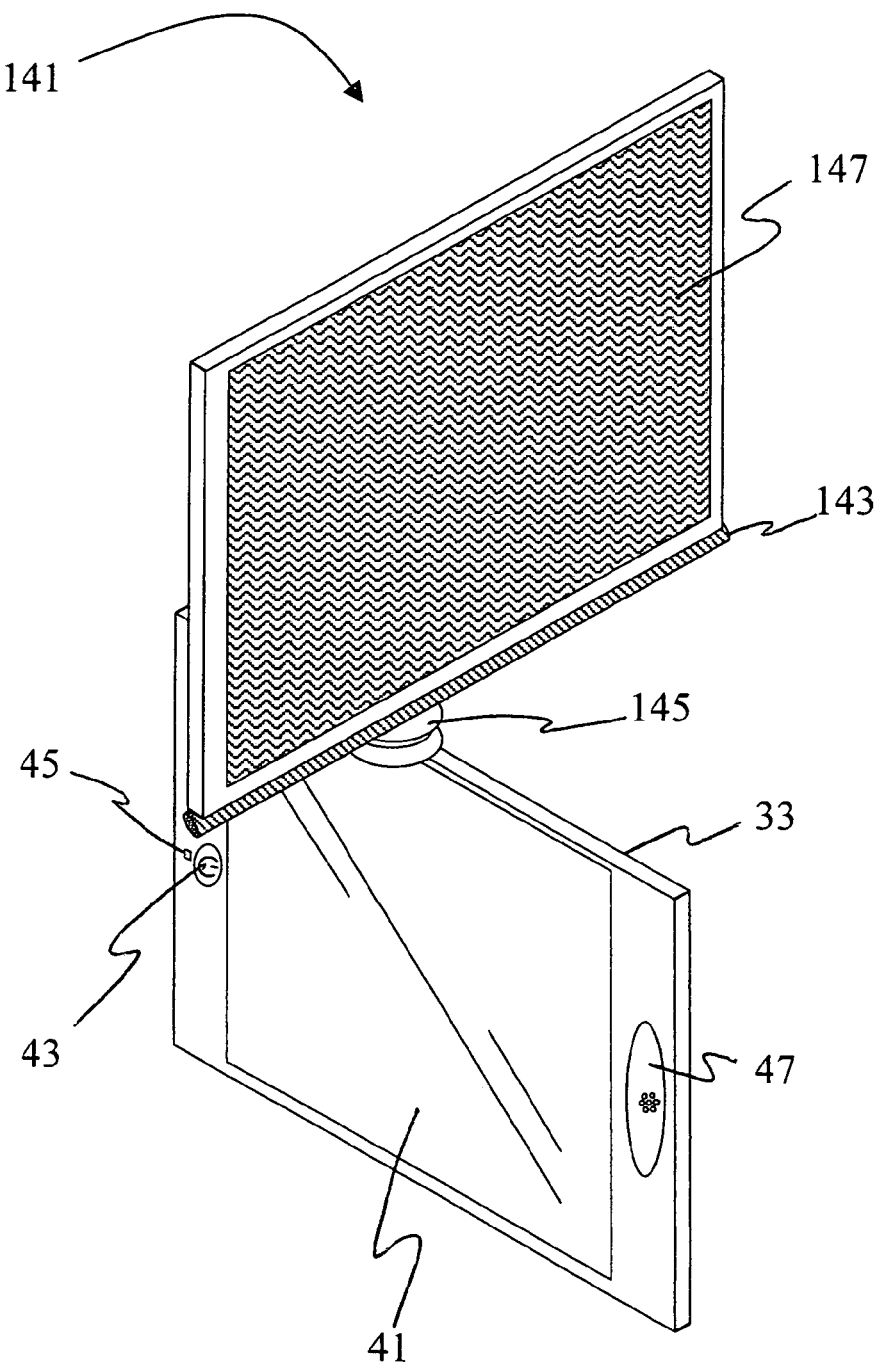
FIG. 31 is a perspective view of the embodiment of a present invention solar powered cell phone shown in FIG. 29, in open position.
Figure 32:
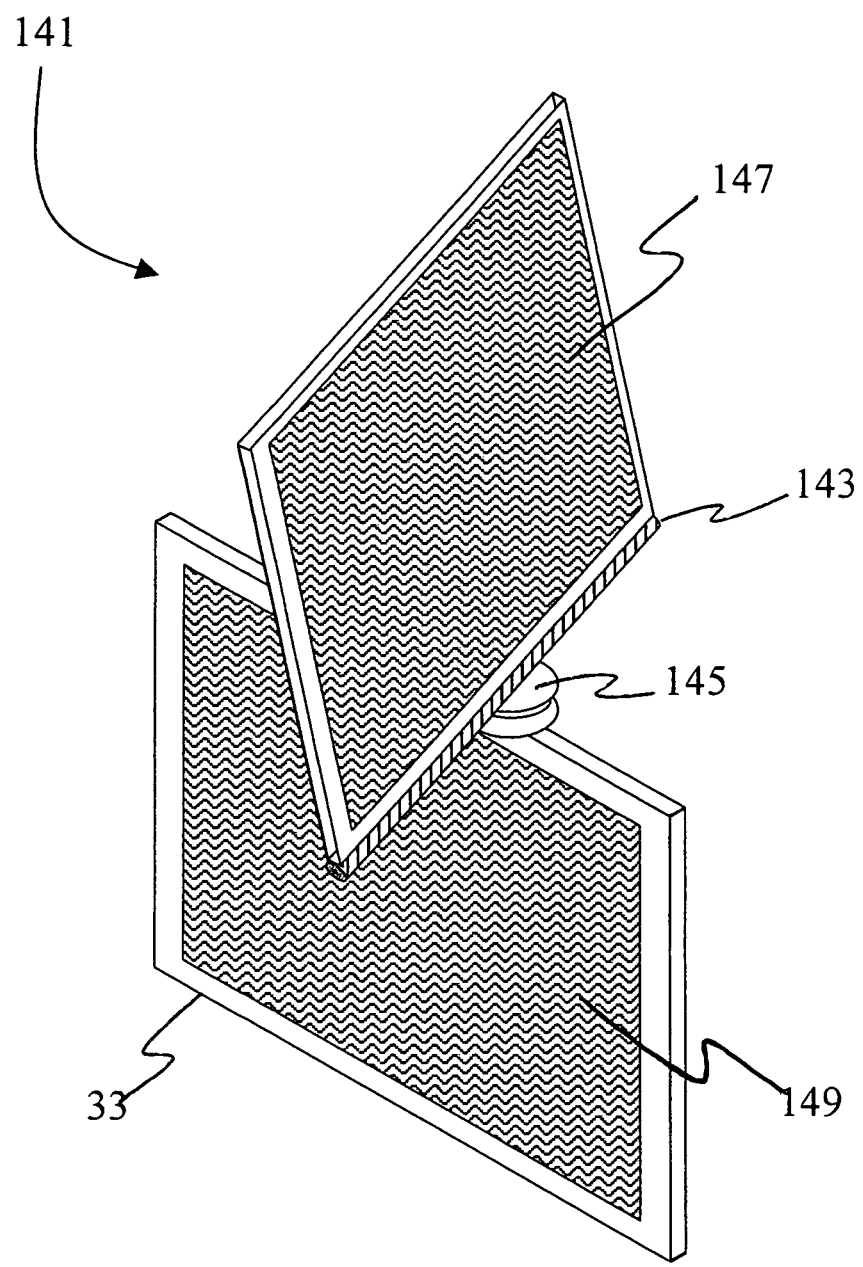
FIG. 32 is a perspective view of the embodiment of a present invention solar powered cell phone shown in FIG. 29, in open position.
Figure 33:
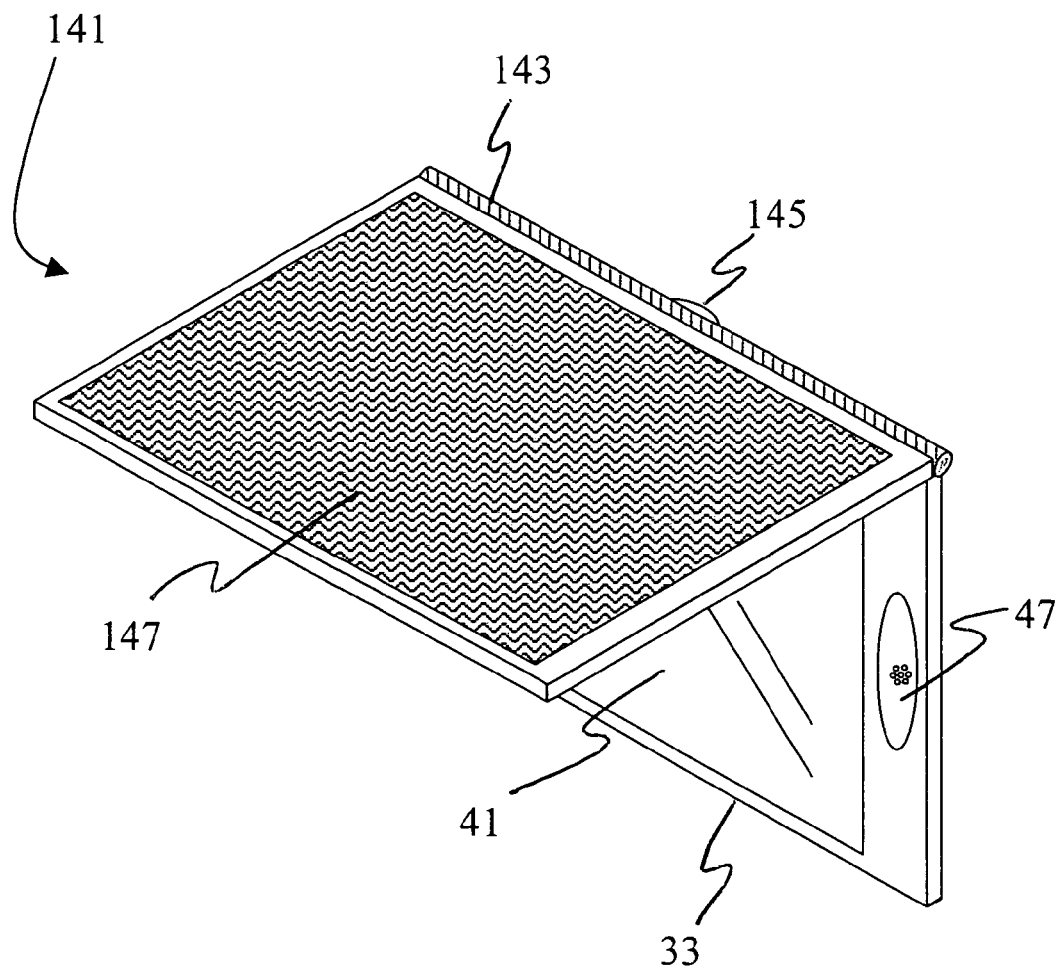
FIG. 33 is a perspective view of the embodiment of a present invention solar powered cell phone shown in FIG. 29, in open position.

FIGS. 29 through 33 show another embodiment of the present invention solar powered cell phone. In this embodiment, a solar powered cell phone 141 includes a movable solar cell panel 147 with a hinge 143 running along one edge. The hinge 143 is connected to a rotational connector 145 that allows rotation in a different direction than the hinge. Both the hinge 143 and the rotational connector 145 are adapted to conduct electricity from the solar cell panel 147 to the rechargeable power storage unit (not shown). As shown in FIG. 30, the rotational connector 145 is connected to the cell phone main housing 33. The cell phone main housing has a screen 41, a power button, 43, a microphone 45, and a speaker 47. FIG. 31 demonstrates that the rotational connector 145 rotates around a different axis than the hinge 143. FIG. 32 shows that a second solar cell panel 149 is immovably attached to the back of cell phone main housing 33. FIG. 33 shows the embodiment of FIGS. 29 through 32 in another position.

FIGS. 34 through 38 show another embodiment of the present invention solar powered cell phone. In this embodiment, a solar powered cell phone 151 includes a cell phone main housing 33. On the back of cell phone main housing 33 a solar cell panel 161 is permanently affixed. Two tracks 153A and 153B are also permanently attached to the back side of cell phone main housing 33. Although two tracks are pictured, in other embodiments more than two tracks are included. In some other embodiments, the tracks are molded into the cell phone main housing 33.

A crossbar 155 spans the distance between track 153A and track 153B. The crossbar 155 is adapted to slide within tracks 153A and 153B. A rotational connector 157 is attached to the crossbar 155. The other side of rotational connector 157 is attached to movable solar cell panel 159. As crossbar 155 slides, solar cell panel 159 slides past the end of cell phone main housing 33. In some embodiments, when the crossbar is fully extended, a releasable latch (not pictured) will hold the crossbar in place until the latch is released. In other embodiments, a high-friction area resists the return motion of the crossbar.

Figure 36:
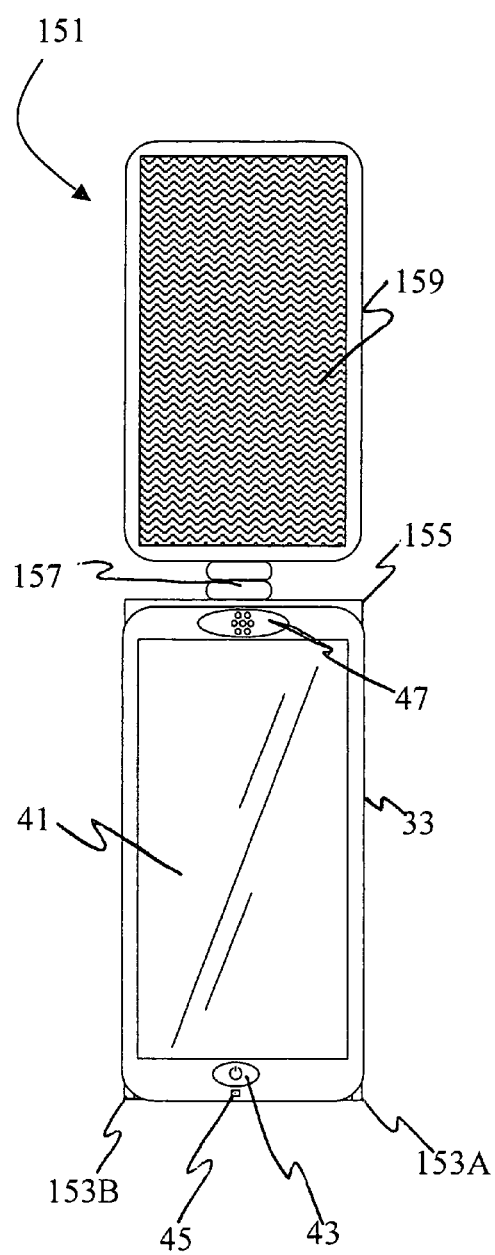
FIG. 36 is a front elevation view of the embodiment of a present invention solar powered cell phone shown in FIG. 34, in open position with solar panel rotated.
Figure 37:
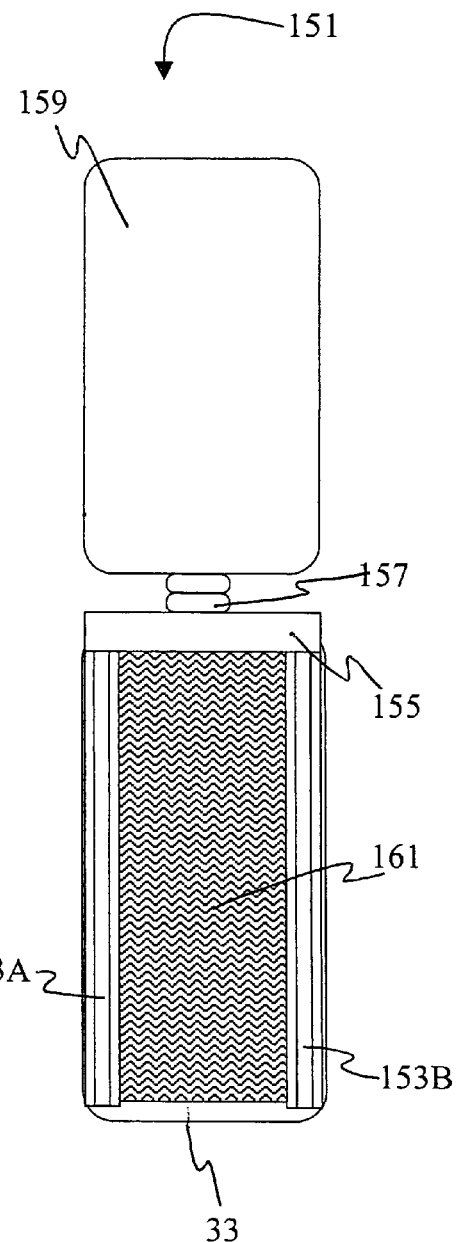
FIG. 37 is a rear elevation view of the embodiment of a present invention solar powered cell phone shown in FIG. 34, in open position with solar panel rotated.

FIG. 34 is a back view; FIG. 35 shows a front view of the solar powered cell phone 151 in the extended position. The solar cell panel 159 has been extended past the end of cell phone main housing 33, but the solar cell panel 159 has not been rotated around rotational connector 157. Cell phone main housing 33 includes a screen 41, a power button 43, a microphone 45, and a speaker 47. In FIG. 36, solar cell panel 159 has been rotated 180 degrees around the rotational connector such that the light-receiving side of solar cell panel 159 faces the same direction as the screen 41. FIG. 36 is a front view; FIG. 37 shows the back view of FIG. 36. The light-receiving side of solar cell panel 159 is not visible, but the light-receiving side of solar cell panel 161 is visible. FIG. 37 also gives another view of tracks 153A and 153B.

Figure 38:
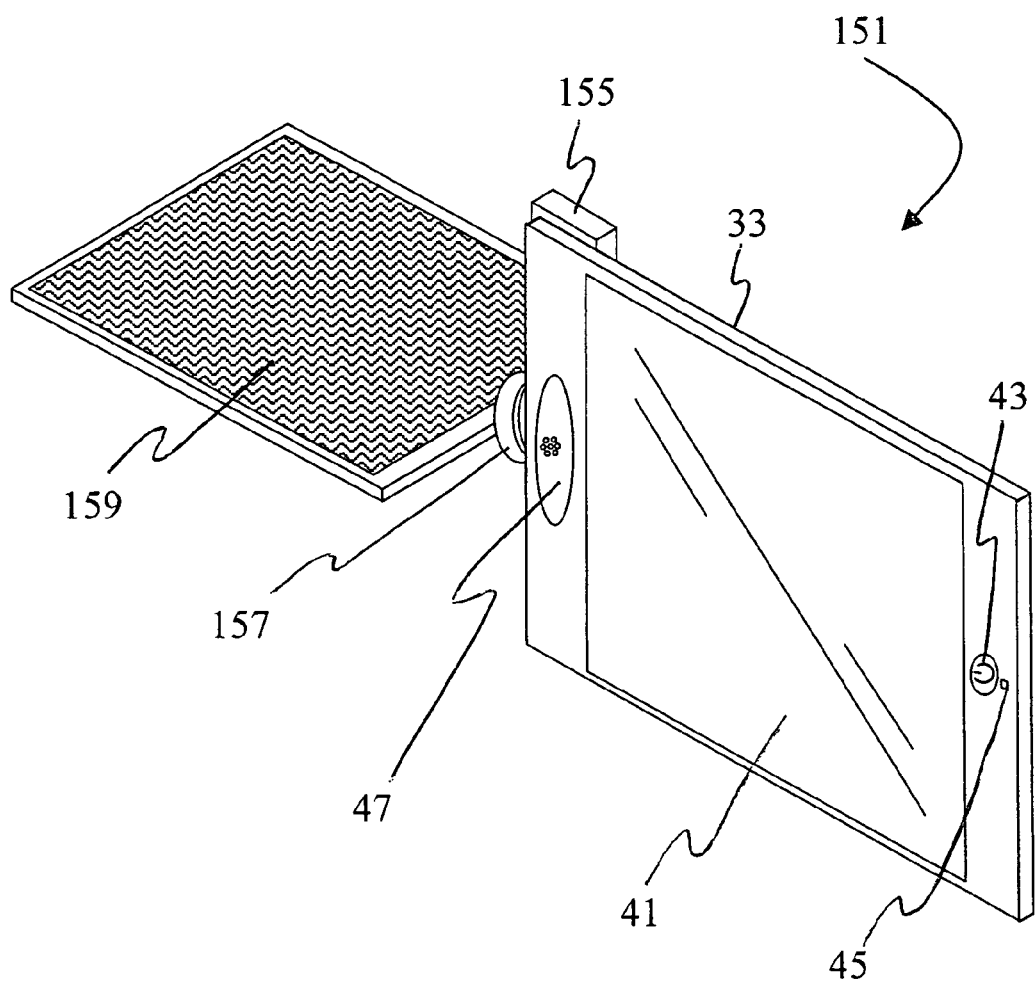
FIG. 38 is a perspective view of the embodiment of a present invention solar powered cell phone shown in FIG. 34, in open position.
Figure 39:
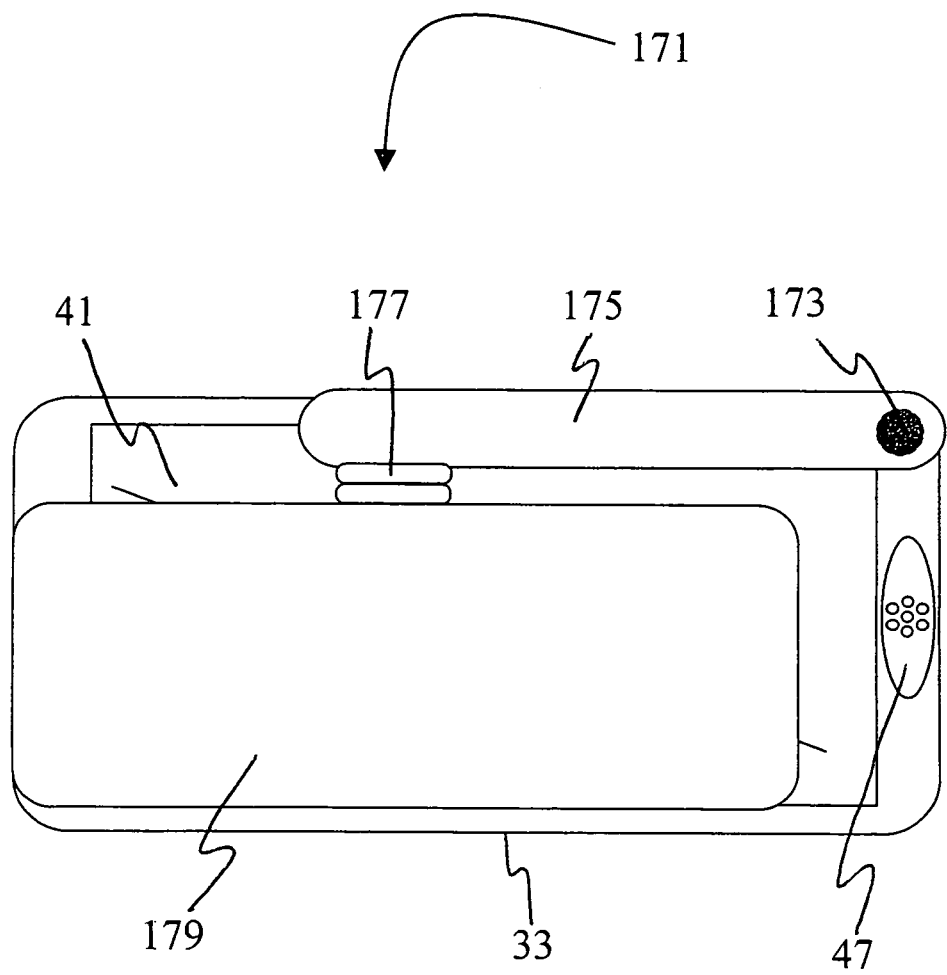
FIG. 39 is a front elevation view of another embodiment of a present invention solar powered cell phone, in closed position.

FIG. 38 shows a perspective view of the embodiment shown in FIGS. 34 through 37. As with FIGS. 35 through 37, FIG. 38 is shown with crossbar 155 and solar cell panel 159 extended. Solar cell panel 159 has been rotated around the rotational connector 157 until it is approximately perpendicular with the cell phone main housing 33.

Figure 40:
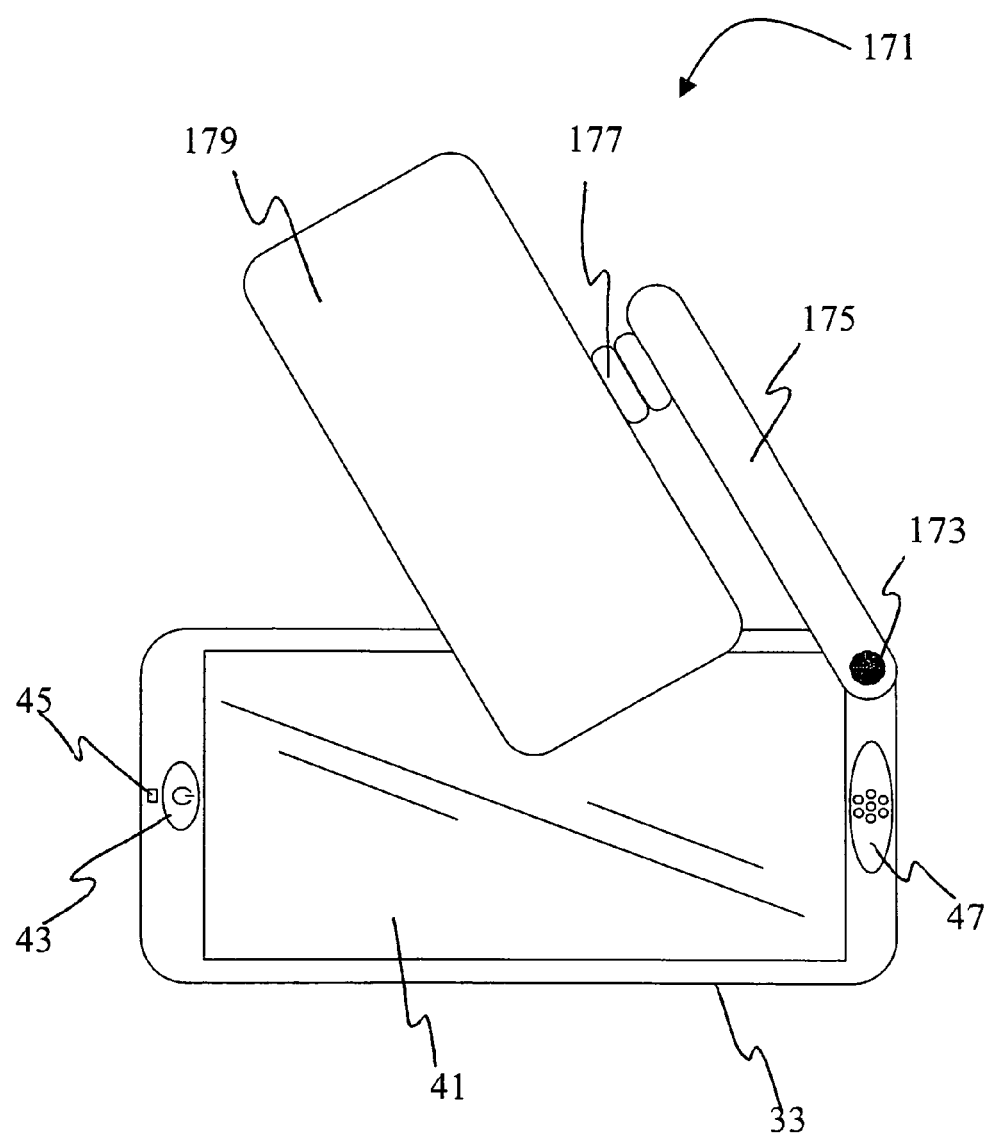
FIG. 40 is a front elevation view of the embodiment of a present invention solar powered cell phone shown in FIG. 39, in open position.
Figure 41:
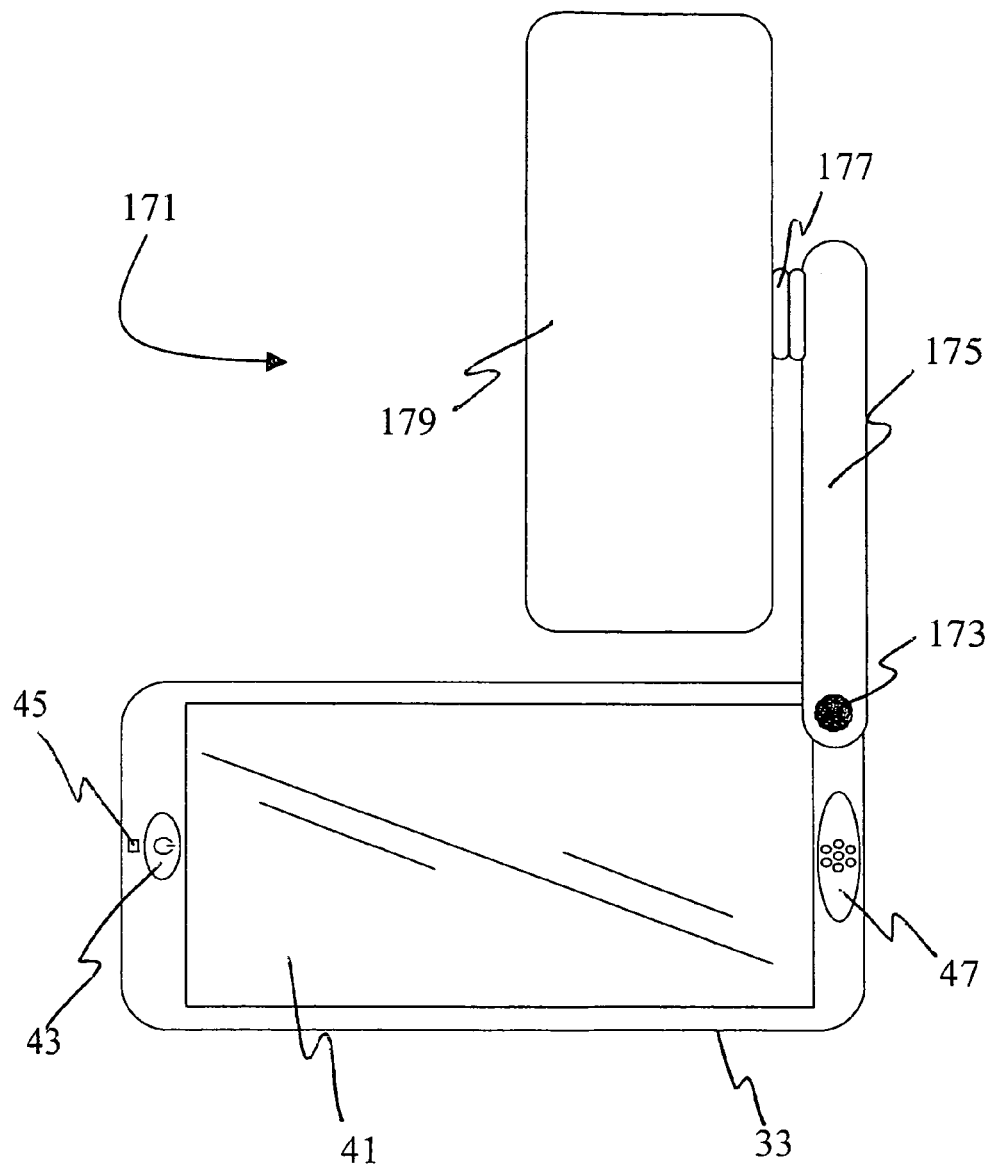
FIG. 41 is a front elevation view of the embodiment of a present invention solar powered cell phone shown in FIG. 39, in open position.
Figure 42:
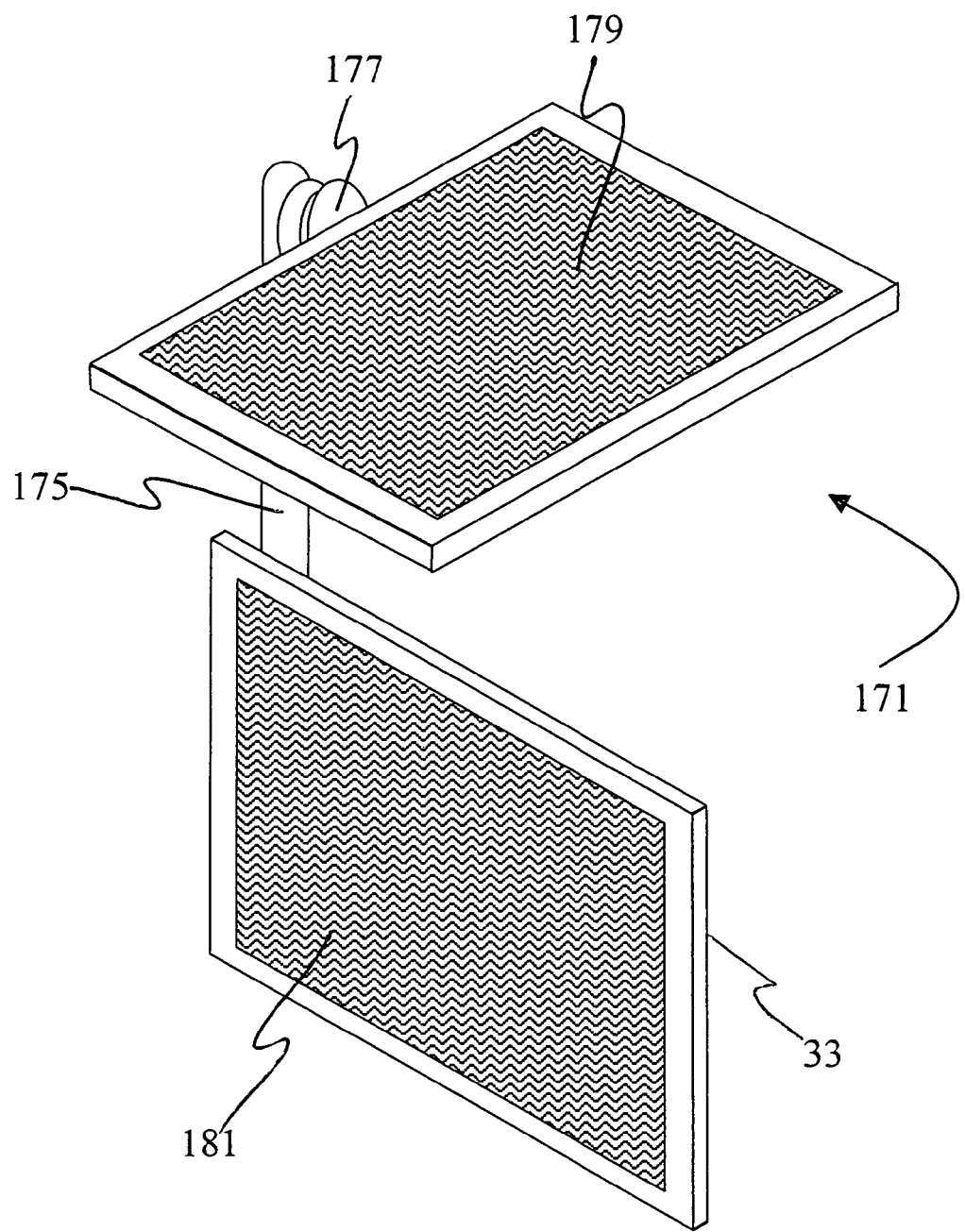
FIG. 42 is a perspective view of the embodiment of a present invention solar powered cell phone shown in FIG. 39, in open position.

FIGS. 39 through 42 show another embodiment of the present invention solar powered cell phone. Cell phone main housing 33 has a screen 41 and a speaker 47. In this embodiment, pivot arm 175 is rotatably attached to the cell phone main housing 33 by a pivot point 173. This allows pivot arm 175 to pivot around pivot point 173. Solar cell panel 179 is attached to pivot arm 175 via a rotational connector 177 that allows solar cell panel 179 to rotate around an additional axis relative to pivot arm 175. As shown in FIGS. 40 and 41, as the pivot arm 175 swings upward around pivot point 173, the solar cell panel 179 also pivots around pivot point 173 until it reaches a point where the solar cell panel 179 is able to rotate around the rotational connector 177 without hitting the cell phone main housing 33. FIG. 42 shows a perspective view with the solar cell panel rotated about 90 degrees around the rotational connector. FIG. 42 also reveals solar cell panel 181 permanently attached to the back of cell phone main housing 33.

Figure 44:
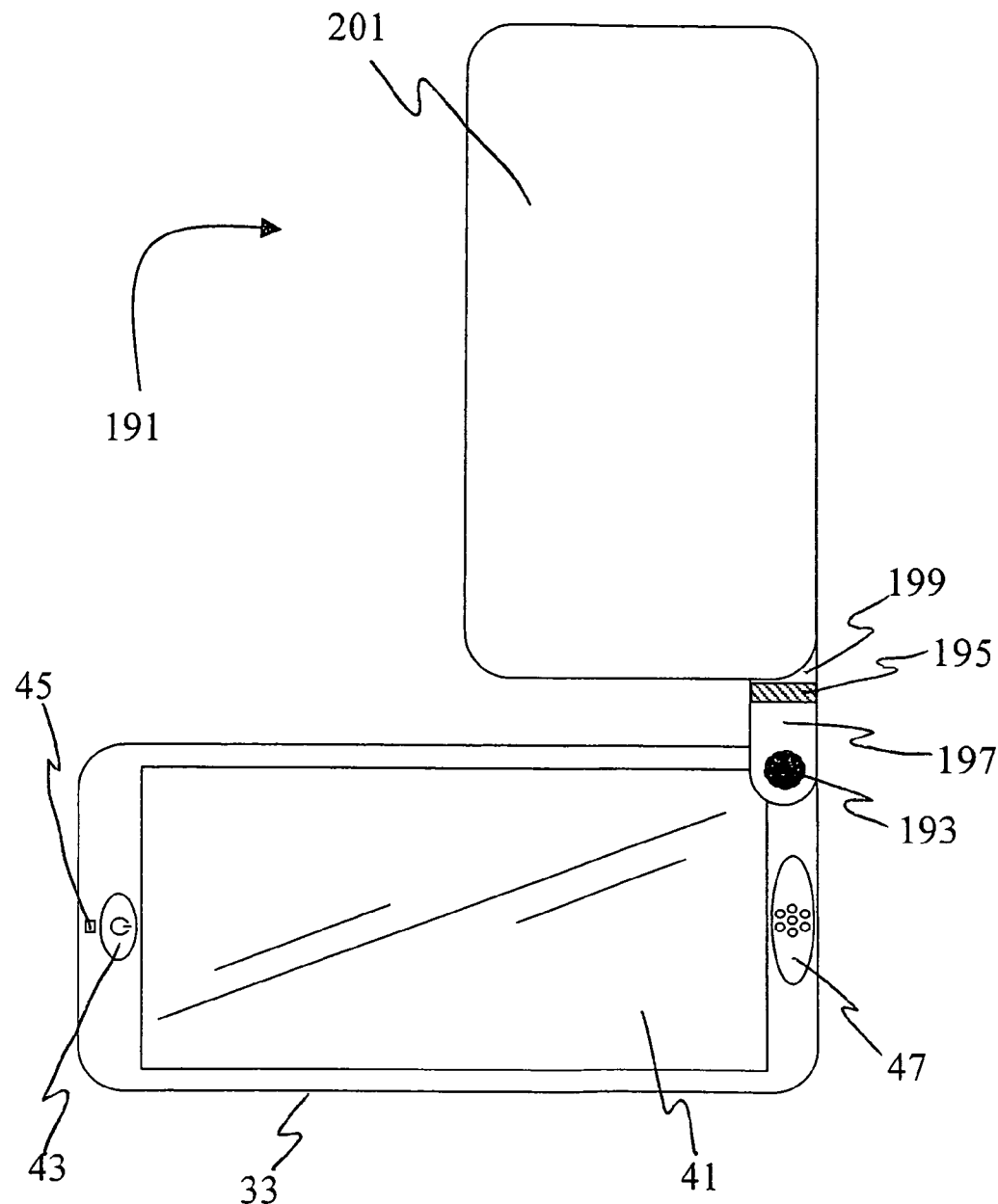

FIGS. 43 through 45 show another embodiment of the present invention solar powered cell phone. Cell phone main housing 33 has a screen 41 and a speaker 47. In this embodiment, pivot arm 197 is rotatably attached to the cell phone main housing 33 by a pivot point 193. A hinged arm 199 is attached to the pivot arm 197 via a hinge 195. The hinge 195 is preferably a ratcheting hinge that allows the hinge 195 to be set at any number of predetermined positions. A solar cell panel 201 is permanently attached to the hinged arm 199 such that as the hinged arm is moved around the hinge, the solar cell panel 201 moves with it. In FIG. 44, the pivot arm 197 has been pivoted around pivot point 193 along with hinge 195, hinged arm 199, and solar cell panel 201. FIG. 45 shows a perspective view of the embodiment shown in FIGS. 43 and 44 in which solar cell panel 201 has been flipped down along hinge 195.

Although FIG. 45 shows the cell phone main housing 33 in an upright orientation, the user can orient the device in any manner desired to expose the light-receiving surfaces of the solar cell panels 201 and 203. For example, as shown in FIG. 45 the solar powered cell phone 191 could be placed such that the edges of the hinged arm 199 and the cell phone main housing 33 rest on a surface. Alternatively, the solar powered cell phone 191 shown in FIG. 45 could be placed in a tent-like position wherein the edges of solar cell panels 201 and 203 rest on a surface, with a space approximating a triangular prism underneath. Similarly, other embodiments shown and described herein can be positioned in a variety of ways; users can move the device to maximize sun exposure, to provide stability for the device, or for any other reason desired.

Turning now to FIGS. 46 and 47, another embodiment of the present invention solar powered cell phone is shown. Solar powered cell phone 211 has a cell phone main housing 33 with a screen 41, a power button 43, a microphone 45, and a speaker 47. A solar panel housing 217 is attached to the cell phone main housing 33. Three solar cell panels 215A, 215B, and 215C are contained within the housing when solar powered cell phone 211 is in the closed position. Rails 213A and 213B are permanently attached to solar cell panel 215A and slide within a pair of tracks (not shown) attached to the back of solar cell panel 215B. Rails 213C and 213D are permanently attached to solar cell panel 215B and slide within a pair of tracks (not shown) attached to the back of solar cell panel 215C. Rails 213E and 213F are permanently attached to solar cell panel 215C and slide within a pair of tracks (not shown) attached to the back of solar panel housing 217. As shown in FIG. 47, this arrangement allows solar cell panels 215A, 215B, and 215C to telescope outward from solar panel housing 217. In this embodiment, the solar cell panels 215A, 215B, and 215C face in the same direction as the cell phone main housing—that is, the light-receiving sides of the solar cell panels 215A, 215B, and 215C face the same direction as the screen 41.

Turning now to FIGS. 48 and 49, another embodiment of the present invention solar powered cell phone is shown. Solar powered cell phone 221 has a cell phone main housing 33. A solar panel housing 227 is attached to the cell phone main housing 33. Three solar cell panels 225A, 225B, and 225C are contained within the housing when solar powered cell phone 221 is in the closed position. Rails 223A and 223B are permanently attached to solar cell panel 225A and slide within a pair of tracks (not shown) attached to the back of solar cell panel 225B. Rails 223C and 223D are permanently attached to solar cell panel 225B and slide within a pair of tracks (not shown) attached to the inside of solar panel housing 227. As shown in FIG. 47, this arrangement allows solar cell panels 225A, 225B, and 225C to telescope outward from solar panel housing 217. In this embodiment, there are only two telescoping solar cell panels, 225A and 225B. A third solar panel 229 is permanently attached to the solar panel housing 227. In this embodiment, the solar cell panels 215A, 215B, and 215C face in the opposite direction from the cell phone main housing—that is, the light-receiving sides of the solar cell panels 215A, 215B, and 215C face the opposite direction from the screen 41.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A solar powered cell phone, comprising:
   a) a cell phone main housing;
   b) cell phone internal mechanisms located within said cell phone main housing, said cell phone internal mechanisms including at least one processor, at least one storage means, at least one speaker, and at least one microphone;
   c) a screen connected to said cell phone internal mechanisms and located on said cell phone main housing;
   d) at least one antenna connected to said cell phone internal mechanisms and attached to said cell phone main housing, said at least one antenna adapted to send and receive information;
   e) a rechargeable power storage unit connected to said cell phone internal mechanisms; and,
   f) at least two solar cell panels connected to said rechargeable power storage unit, wherein at least one of said at least two solar cell panels is movably connected to said main housing, said at least one of said at least two solar cell panels having a first position, being a closed position, and having a second position, being an open position, and wherein said at least one of said two solar panels that is movably connected to said main housing is connected by a connection selected from the group consisting of i.) pivotal connection with single plain rotation; ii) telescopic movement connection; and, iii) compound movement connection,
wherein said at least one of said at least two solar cell panels is movable from said first position to said second position for solar recharging of said rechargeable power storage unit, and is movable from said second position to said first position for storage.

2. The solar powered cell phone of claim 1 wherein said at least one of said at least two solar cell panels is pivotally connected to said main housing so as to allow single plane rotation of said at least two solar cell panels for pivoting rotational movement from said first position to said second position and subsequently from said second position to said first position.

3. The solar powered cell phone of claim 1 wherein said at least one of said at least two solar cell panels is telescopically connected to said main housing for telescopic movement from said first position to said second position and subsequently from said second position to said first position.

4. The solar powered cell phone of claim 1 wherein said at least one of said at least two solar cell panels is connected to said main housing by a compound movement connection that includes a hinge and a rotational connector connected to said hinge, wherein one of said hinge and said rotational connector is connected to said at least one of said at least two solar cell panels and the other of said hinge and rotational connector is connected to said main housing such that said at least one of said at least two solar cell panels is movable via flip up movement along said hinge, and by rotational movement in a different direction along said rotational connector, from said first position to said second position and subsequently from said second position to said first position.

5. The solar powered cell phone of claim 1 wherein said at least one of said at least two solar cell panels is connected to said main housing by a compound movement connection that includes a sliding mechanism and a rotational connector connected to said sliding mechanism, wherein one of said sliding mechanism and said rotational connector is connected to said at least one of said at least two solar cell panels and the other of said sliding mechanism and rotational connector is connected to said main housing such that said at least one of said at least two solar cell panels is movable via sliding movement, and by rotational movement in a different direction along said rotational connector, from said first position to said second position and subsequently from said second position to said first position.

6. The solar powered cell phone of claim 5 wherein said sliding mechanism is at least one track and rail.

7. The solar powered cell phone of claim 1 wherein said at least one of said at least two solar cell panels is connected to said main housing by a compound movement connection that includes a pivot point, a pivot arm connected to said pivot point, and a rotational connector connected to said pivot arm, wherein one of said pivot point and said rotational connector is connected to said at least one of said at least two solar cell panels and the other of said pivot point and rotational connector is connected to said main housing such that said at least one of said at least two solar cell panels is movable via pivoting rotational movement, and by rotational movement in a different direction along said rotational connector, from said first position to said second position and subsequently from said second position to said first position.

8. The solar powered cell phone of claim 1 wherein said at least one of said at least two solar cell panels is connected to said main housing by a compound movement connection that includes a pivot point, a pivot arm connected to said pivot point, a hinge connected to said pivot arm, and a hinge arm connected to said hinge, wherein one of said pivot point and said hinge arm is connected to said at least one of said at least two solar cell panels and the other of said pivot point and hinge arm is connected to said main housing such that said at least one of said at least two solar cell panels is movable via pivoting rotational movement, and by flip up movement in a different direction along said hinge, from said first position to said second position and subsequently from said second position to said first position.

9. The solar powered cell phone of claim 1 wherein there is at least one fixed solar cell immovably connected to said cell phone main housing and electrically connected to said rechargeable power storage unit.

* * * * *